United States Patent
Murray et al.

(10) Patent No.: US 11,765,626 B2
(45) Date of Patent: *Sep. 19, 2023

(54) CONNECTED MODE MOBILITY IN NEW RADIO

(71) Applicant: IPLA HOLDINGS INC., New York, NY (US)

(72) Inventors: Joseph M. Murray, Schwenksville, PA (US); Pascal M. Adjakple, Great Neck, NY (US); Stephen E. Terry, Northport, NY (US)

(73) Assignee: IPLA HOLDINGS INC., New York, NY (US)

( * ) Notice: Subject to any disclaimer, the term of this patent is extended or adjusted under 35 U.S.C. 154(b) by 14 days.

This patent is subject to a terminal disclaimer.

(21) Appl. No.: 17/541,473

(22) Filed: Dec. 3, 2021

(65) Prior Publication Data
US 2022/0095173 A1    Mar. 24, 2022

Related U.S. Application Data

(63) Continuation of application No. 16/637,016, filed as application No. PCT/US2018/046050 on Aug. 9, 2018, now Pat. No. 11,228,948.
(Continued)

(51) Int. Cl.
*H04W 36/00* (2009.01)
*H04W 76/27* (2018.01)
(Continued)

(52) U.S. Cl.
CPC ....... *H04W 36/0005* (2013.01); *H04L 5/0048* (2013.01); *H04W 36/04* (2013.01);
(Continued)

(58) Field of Classification Search
CPC . H04W 36/00; H04W 36/04; H04W 36/0005; H04W 36/0011; H04W 36/0016;
(Continued)

(56) References Cited

U.S. PATENT DOCUMENTS

| 11,638,163 B2* | 4/2023 | Lee | ........................ H04L 5/0048 |
| | | | 370/329 |
| 2009/0175161 A1* | 7/2009 | Yi | ........................ H04W 74/085 |
| | | | 370/328 |

(Continued)

FOREIGN PATENT DOCUMENTS

| CN | 106797656 A | 5/2017 |
| JP | 2017135758 A | 8/2017 |

(Continued)

OTHER PUBLICATIONS

Huawei, HiSilicon, Baseline handover procedure for inter gNB handover in NR[online], 3GPP TSG RAN WG2 adhoc_2017_06_NR R2-1706705, Internet< URL:http://www.3gpp.org/ftp/tsg_ran/WG2_RL2/TSGR2_AHs/2017_06_NR/Docs/R2-1706705.zip>, Jun. 17, 2017.

(Continued)

*Primary Examiner* — Warner Wong
(74) *Attorney, Agent, or Firm* — XSENSUS LLP

(57) ABSTRACT

The present application is at least directed to an apparatus in a network including a non-transitory memory including instructions stored thereon for obtaining a resource for accessing a target cell in the network. The apparatus includes a processor, operably coupled to the non-transitory memory, configured to execute the instructions of detecting plural beams associated with the target cell. The processor also executes the instructions of determining one or more of the plural detected beams meeting a threshold for performing random access. The processor also executes the instructions of evaluating if a physical random access channel (PRACH)

(Continued)

resource is associated with the one or more determined beams meeting the threshold. The processor further executes the instructions of selecting one of the evaluated beams exhibiting a reference signal received power (RSRP) above a predetermined value. The processor even further executes the instructions of picking the PRACH resource associated with the selected beam.

12 Claims, 24 Drawing Sheets

Related U.S. Application Data

(60) Provisional application No. 62/543,599, filed on Aug. 10, 2017, provisional application No. 62/564,452, filed on Sep. 28, 2017, provisional application No. 62/580,639, filed on Nov. 2, 2017.

(51) Int. Cl.
| | | |
|---|---|---|
| *H04L 5/00* | (2006.01) | |
| *H04W 36/04* | (2009.01) | |
| *H04W 56/00* | (2009.01) | |
| *H04W 74/08* | (2009.01) | |
| *H04W 72/044* | (2023.01) | |
| *H04W 76/10* | (2018.01) | |

(52) U.S. Cl.
CPC ..... *H04W 56/001* (2013.01); *H04W 74/0833* (2013.01); *H04W 76/27* (2018.02); *H04W 72/046* (2013.01); *H04W 76/10* (2018.02)

(58) Field of Classification Search
CPC . H04W 36/0072; H04W 76/20; H04W 76/27; H04W 56/00; H04W 56/001; H04W 74/00; H04W 74/08; H04W 74/0833; H04W 74/0841; H04W 72/046; H04W 36/0083; H04W 36/00837; H04W 36/16; H04W 36/20; H04W 36/24; H04W 36/36; H04W 36/38; H04W 36/385; H04L 5/0048; H04L 5/005; H04L 5/0051
See application file for complete search history.

(56) References Cited

U.S. PATENT DOCUMENTS

| | | | |
|---|---|---|---|
| 2016/0157267 A1 | 6/2016 | Frenne | |
| 2018/0332520 A1* | 11/2018 | Cheng | H04W 74/0891 |
| 2018/0368187 A1 | 12/2018 | Jung et al. | |
| 2019/0104549 A1 | 4/2019 | Deng et al. | |
| 2019/0208547 A1 | 7/2019 | Koskela et al. | |
| 2019/0215888 A1 | 7/2019 | Cirik et al. | |
| 2020/0008245 A1 | 1/2020 | Yan et al. | |
| 2020/0015273 A1* | 1/2020 | Zhang | H04B 7/088 |
| 2020/0052767 A1 | 2/2020 | Wang et al. | |
| 2020/0107235 A1 | 4/2020 | Peisa et al. | |
| 2020/0229180 A1* | 7/2020 | Liu | H04W 76/27 |
| 2020/0275479 A1* | 8/2020 | Peisa | H04W 74/0833 |
| 2020/0329503 A1 | 10/2020 | Da et al. | |
| 2020/0413392 A1 | 12/2020 | Purkayastha et al. | |
| 2021/0058132 A1* | 2/2021 | Xu | H04W 76/19 |
| 2021/0068161 A1* | 3/2021 | Takahashi | H04W 74/0833 |
| 2021/0112539 A1 | 4/2021 | Wu et al. | |
| 2021/0160724 A1 | 5/2021 | Yang | |
| 2021/0168858 A1* | 6/2021 | Liu | H04L 5/0091 |
| 2021/0242923 A1* | 8/2021 | Takeda | H04W 72/23 |
| 2023/0033917 A1* | 2/2023 | Chen | H04W 76/27 |

FOREIGN PATENT DOCUMENTS

| | | |
|---|---|---|
| JP | 2020519071 A | 6/2020 |
| WO | 2017/000834 A1 | 1/2017 |
| WO | 2017/022902 A1 | 2/2017 |
| WO | WO-2017026444 A1 | 2/2017 |
| WO | WO-2018203816 A1 | 11/2018 |

OTHER PUBLICATIONS

MediaTek Inc., Handover in NR Considering Multiple-beam Operation[on line], 3GPP TSG RAN WG2 #98 R2-1704525, Internet<URL:http://www.3gpp.org/ftp/tsg_ran/WG2_RL2/TSGR2_98/Docs/R2-1704525.zip>, May 5, 2017.

3GPP TR 38.804 V14.0.0, "3rd Generation Partnership Project; Technical Specification Group Radio Access Network; Study on New Radio Access Technology; Radio Interface Protocol Aspects (Release 14)", Mar. 2017, 57 pages.

3GPP TR 38.913 V14.3.0, 3rd Generation Partnership Project; Technical Specification Group Radio Access Network; Study on Scenarios and Requirements for Next Generation Access Technologies; (Release14), Jun. 2017, 39 pages.

3GPP TS 36.300 V14.3.0, 3rd Generation Partnership Project; Technical Specification Group Radio Access network; Evolved Universal Terrestrial Radio Access (E-UTRA) and Evolved Universal Terrestrial Radio Access Network (E-UTRAN); Overall Description; Stage 2 (Release 14), Jun. 2017, 331 pages.

3GPP TS 36.321 v14.3.0, "3rd Generation Partnership Project; Technical Specification Group Radio Access Network; Evolved Universal Terrestrial Radio Access (E-UTRA); Medium Access Control (MAC) Protocol Specification (Release 14)", Jun. 2017, 107 pages.

3GPP TS 36.331 V14.3.0, 3rd Generation Partnership Project; Technical Specification Group Radio Access Network; Evolved Universal Terrestrial Radio Access (EUTRA); Radio Resource Control (RRC); Protocol Specification (Release 14), Jun. 2017, 745 pages.

3GPP TS 38.300 V0.5.0, "3rd Generation Partnership Project; Technical Specification Group Radio Access Network; NR; NR and NG-RAN Overall Description; Stage 2 (Release 15)", Jun. 2017, 55 pages.

3GPP TSG RAN WG1 #85 R1-164013, Samsung, "Framework for Beamformed Access", May 2016, 4 pages.

3GPP TSG RAN WG1 Meeting #87, R1-1612890, Sony, "Considerations on Multiple Beams RACH Procedure", Nov. 2016, 4 pages.

3GPP TSG-RAN WG2 Meeting #94, R2-163372, Samsung, "Random Access Procedure in NR", May 2019 7 pages.

3GPP TSG-RAN WG2 Meeting NR ad-hoc, R2-1706912, Qualcomm Incorporated, "Measurement Reporting and Beam Refinement During RACH", Jun. 2017, 8 pages.

ETSI TS 136 213 V14.3.0, Technical Specification, "LTE; Evolved Universal Terrestrial Radio Access (E-UTRA); Physical Layer Procedures (3GPP TS36.213 version 14.3.0 Release 14)", Aug. 2017, 462 pages.

Ericsson: "Further details of handover execution in NR", 3GPP Draft: R2-1702672—3rd Generation Partnership Project (3GPP), Mobile Competence Centre ; 650, Route Des Lucioles ; F-06921 Sophia-Antipolis Cedex ; France, vol. RAN WG2, No. Spokane, USA; Apr. 3, 2017-Apr. 7, 2017 Apr. 3, 2017 (Apr. 3, 2017), XP051244672.

Ericsson: "Further details of handover execution in NR", 3GPP Draft; R2-1707276—3rd Generation Partnership Project (3GPP), Mobile Competence Centre ; 650, Route Des Lucioles ; F-06921 Sophia-Antipolis Cedex ; France, vol. RAN WG2, No. Qingdao, China; Jun. 27, 2017-Jun. 29, 2017 Jun. 26, 2017 (Jun. 26, 2017), XP051301764.

Qualcomm Incorporated, "Measurement reporting and beam refinement during RACH", 3GPP Draft R2-1706912, Jun. 26, 2017 3rd Generation Partnership Project (3GPP), Mobile Competence Centre ; 650, route des Lucioles ; F06921 Sophia-Antipolis Cedex ; France. vol. RAN WG2, Nr: Q.

* cited by examiner

| R | Timing Advance Cmd. | | Oct 1 |
|---|---|---|---|
| Timing Advance Cmd. | | UL Grant | Oct 2 |
| UL Grant | | | Oct 3 |
| Temporary C-RNTI | | | Oct 4 |
| Temporary C-RNTI | | | Oct 5 |
| Beam Switch Command | | | Oct 6 |

CONNECTED MODE MOBILITY IN NEW RADIO

CROSS REFERENCE TO RELATED APPLICATIONS

This application is a continuation of U.S. patent application Ser. No. 16/637,016 filed Feb. 6, 2020 which is the National Stage Application of International Patent Application No. PCT/US2018/046050, filed Aug. 9, 2018, which claims the benefit of priority of U.S. Provisional application No. 62/543,599 filed Aug. 10, 2017 entitled, "Connected Mode Mobility in New Radio," U.S. Provisional application No. 62/564,452 filed Sep. 28, 2017, entitled, "Connected Mode Mobility in New Radio," and U.S. Provisional application No. 62/580,639 filed Nov. 2, 2017, entitled, "Connected Mode Mobility in New Radio," the contents of which are incorporated by reference in their entireties.

FIELD

The present application is directed to methods and systems for connected mode mobility in new radio (NR).

BACKGROUND

RAN2 has agreed that the handover command may include a set of dedicated and/or common PRACH resources that are associated with beams of the target cell. The dedicated PRACH resources, if provided, will be associated with beams considered to be suitable, based on RRM measurements reported by the UE. However, given the propagation characteristics of the channel for high frequency deployments, it is possible that the quality of one or more of beams that were considered suitable at the time of the measurement report has degraded by the time the handover command is received.

In the scenario when UEs only consider beams associated with dedicated PRACH resources when selecting the beam to access the target cell, the UE may select a lower quality beam requiring preamble retransmission(s) before successfully completing the random access procedure. Selecting a beam associated with a common PRACH resource and performing Contention Based Random Access (CBRA) may be better than selecting a beam associated with a dedicated PRACH resource and performing Contention Free Random Access (CFRA).

Alternatively, if the UE selected the "best" beam from the superset of beams associated with dedicated and common PRACH resources, the UE may select a beam associated with a common PRACH resource that requires CBRA and may require preamble retransmission(s) due to collisions. In such a scenario, selecting a lower quality beam associated with a dedicated PRACH resource and performing CFRA may be better.

For high frequency deployments, beamforming will be used to compensate for high propagation loss. Several narrow high gain beams are expected to be used to provide reliable coverage within a cell. Some beams will have a higher concentration of UEs within their coverage than other beams. Attempting to access the target cell via a congested beam could result in increased interruption time during handover due to preamble collisions, reception of back off indications, etc. Furthermore, even when the UE is able to access the target cell via a congested beam, once the access is complete the UE may be required to switch to a different beam before commencing with data transmissions, which will further increase the interruption time.

In long-term evolution (LTE) technology, UEs perform a random access procedure with the same set of configured parameters agnostic of the access request's purpose. However, a need exists in NR to support a more diverse set of use cases exhibiting different performance objectives when performing an access request. A need also exists in the art to support a prioritized random access procedure for NR.

SUMMARY

This summary is provided to introduce a selection of concepts in a simplified form that are further described below in the Detailed Description. This Summary is not intended to limit the scope of the claimed subject matter. The foregoing needs are met, to a great extent, by the present application describing.

One aspect of the present application is directed to an apparatus in a network including a non-transitory memory including instructions stored thereon for obtaining a resource for accessing a target cell in the network. The apparatus includes a processor, operably coupled to the non-transitory memory, configured to execute the instructions of detecting plural beams associated with the target cell. The processor also executes the instructions of determining one or more of the plural detected beams meeting a threshold for performing random access. The processor also executes the instructions of evaluating if a physical random access channel (PRACH) resource is associated with the one or more determined beams meeting the threshold. The processor further executes the instructions of selecting one of the evaluated beams exhibiting a reference signal received power (RSRP) above a predetermined value. The processor even further executes the instructions of picking the PRACH resource associated with the selected beam.

Another aspect of the application is directed to an apparatus in a network including a non-transitory memory including instructions stored thereon for physical random access channel (PRACH) resource selection. The apparatus includes a processor, operably coupled to the non-transitory memory, configured to execute the instructions of determining a list of contention free random access (RA) resources has been received from a radio resource control (RRC). The processor also executes the instructions of determining if the list includes a group of synchronization signal block (SSB) indices or channel state information reference signal (CSI-RS) indices. The processor also executes the instructions of selecting an index from either the group of SSB indices or CSI-RS indices. The processor further executes the instruction of configuring a preamble index to a random access (RA) preamble index associated with the selected index. The processor even further executes the instructions of transmitting the RA preamble corresponding to the index to a cell in the network.

Yet another aspect of the application is directed to an apparatus in a network including a non-transitory memory including instructions stored thereon for performing handover to a target cell in the network. The apparatus includes a processor, operably coupled to the non-transitory memory, configured to execute the instructions of sending a measurement report to a source node. The processor also executes the instructions of receiving, from the source node, a handover command message. The handover command message is based on the source node determining, based upon the measurement report and radio resource monitoring (RRM) information, whether to assign the apparatus to the target cell. The handover command message is also based on the source node transmitting a handover request to the target cell. The handover command message is further based on source node receiving a handover acknowledgement message from the target cell. The processor of the apparatus further executes the instructions of sending, based on the handover command message, a random access preamble (RAP) to the target cell on a first beam. The processor of the apparatus even further executes the instructions of receiving a random access response (RAR) from the target cell.

There has thus been outlined, rather broadly, certain embodiments of the invention in order that the detailed description thereof may be better understood, and in order that the present contribution to the art may be better appreciated.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

DETAILED DESCRIPTION OF THE ILLUSTRATIVE EMBODIMENTS

Figure 1A:
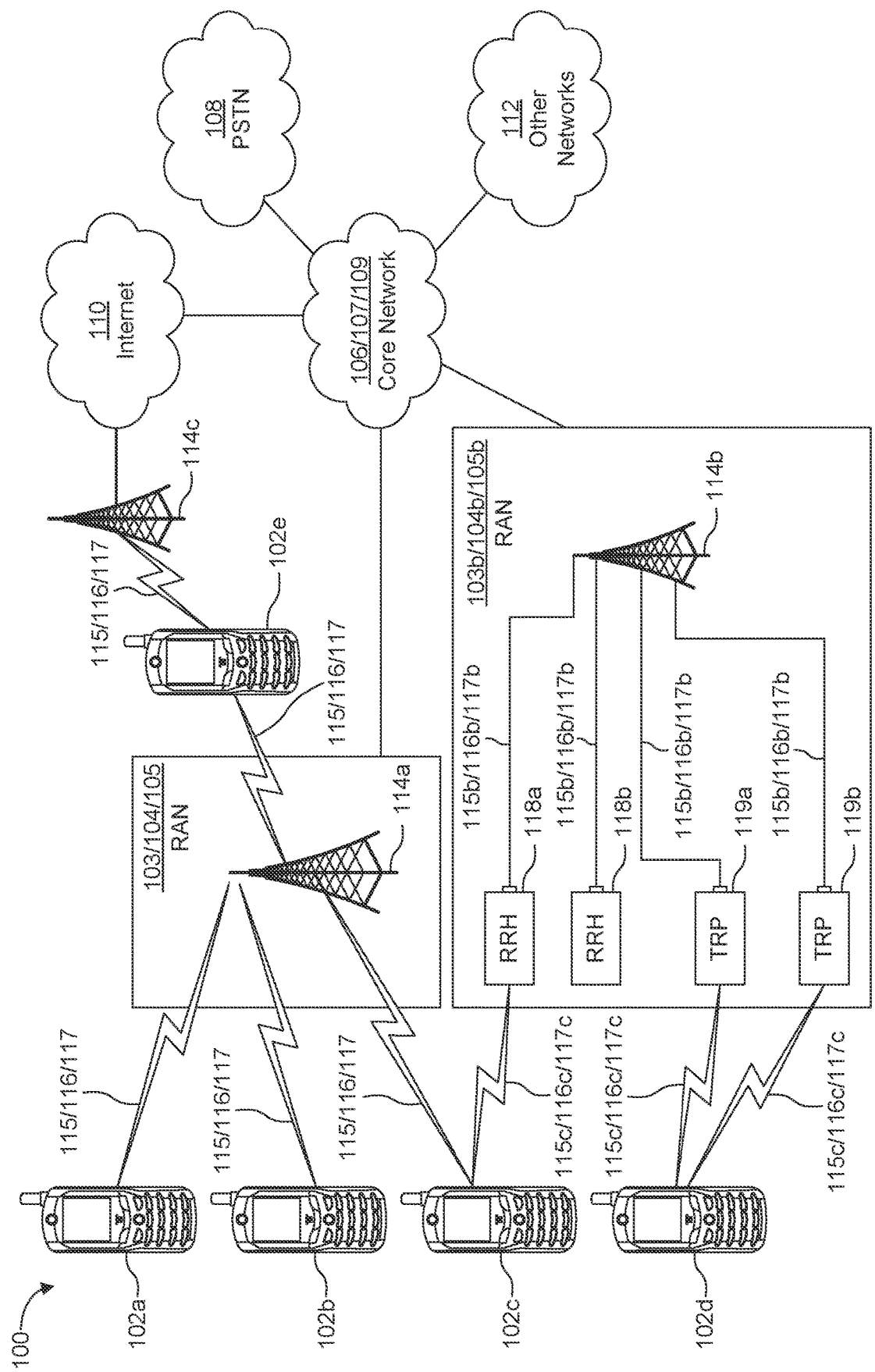
FIG. 1A illustrates an exemplary communications system according to an embodiment.

A detailed description of the illustrative embodiment will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

Generally, the application describes methods and systems for selecting the beams to be included in the measurement report. One aspect of the application describes methods to optimally select the PRACH resource used for accessing the target cell from the set of dedicated and/or common PRACH resources in the handover command. An NR-RACH-ConfigDedicated IE may be used to signal the dedicated RACH configuration in the handover command. A PRACH resource selection model may be integrated with the RRM measurement model.

Another aspect of the application describes a method to perform PRACH resource selection from a set of PRACH resources associated with a narrow beam that may be used for a first access attempt. This may be followed by PRACH resource selection from a set of PRACH resource associated with a wide beam that may be used for a second access attempt in the event the first access attempt is not successful.

A further aspect of the application describes a procedure that may be used to perform load balancing between the beams of the target cell when performing random access. A MAC RAR may optionally include a Beam Switch Command that may be used to direct the UE to use a different beam.

Yet a further aspect of the application is directed to prioritized random access. This may include a method to assign priorities to different types of random access events. This may also include a method to assign different sets of values to the random access parameters where the set of assigned values are based on the random access priority.

Definitions/Acronyms

Provided below are definitions for terms and phrases commonly used in this application in Table 1.

TABLE 1

| Acronym | Term or Phrase |
|---|---|
| AMF | Access and Mobility Management |
| ARQ | Automatic Repeat Request |
| AS | Access Stratum |
| CA | Carrier Aggregation |
| CBRA | Contention Based Random Access |
| CFRA | Contention Free Random Access |
| CMAS | Commercial Mobile Alert System |
| CN | Core Network |
| C-RNTI | Cell Radio-Network Temporary Identifier |
| CSI-RS | Channel State Information Reference Signal |
| DC | Duel Connectivity |
| DL | Downlink |
| DL-SCH | Downlink Shared Channel |
| DRX | Discontinuous Reception |
| EAB | Extended Access Barring |
| eMBB | Enhanced Mobile Broadband |
| eNB | Evolved Node B |
| EPC | Evolved Packet Core |
| ETWS | Earthquake and Tsunami Warning System |
| E-UTRA | Evolved Universal Terrestrial Radio Access |
| E-UTRAN | Evolved Universal Terrestrial Radio Access Network |
| FDD | Frequency Division Duplex |
| FFS | For Further Study |
| GERAN | GSM EDGE Radio Access Network |
| gNB | NR Node B |
| GSM | Global System for Mobile Communications |
| HARQ | Hybrid Automatic Repeat Request |
| HNB | Home eNB |
| HO | Handover |
| IE | Information Element |
| KPI | Key Performance Indicators |
| L1 | Layer 1 |
| L2 | Layer 2 |
| L3 | Layer 3 |
| LTE | Long Term Evolution |
| MAC | Medium Access Control |
| MBMS | Multimedia Broadcast Multicast Service |
| MCG | Master Cell Group |
| NGC | Next Generation Core |
| MIB | Master Information Block |
| MTC | Machine-Type Communications |
| mMTC | Massive Machine Type Communication |
| NAS | Non-Access Stratum |
| NR | New Radio |
| OFDM | Orthogonal Frequency Division Multiplexing |
| PCell | Primary Cell |
| PHY | Physical Layer |
| PRACH | Physical Random Access Channel |
| QoS | Quality of Service |
| RACH | Random Access Channel |
| RAN | Radio Access Network |
| RAP | Random Access Preamble |
| RAR | Random Access Response |
| RAT | Radio Access Technology |
| RRC | Radio Resource Control |
| RRM | Radio Resource Monitoring |
| RSRP | Reference Signal Received Power |
| RSRQ | Reference Signal Received Quality |
| SAI | Service Area Identities |
| sCell | Secondary Cell |
| SCG | Secondary Cell Group |
| SC-PTM | Single Cell Point to Multipoint |
| SDU | Service Data Unit |
| SI | System Information |
| SIB | System Information Block |
| SN | Sequence Number |
| SR | Scheduling Request |
| SS | Synchronization Signal |
| SSB | SS Block |
| sTAG | Secondary Time Advance Group |
| TDD | Time Divisional Duplex |
| T/F | Time/Frequency |
| TRP | Transmission and Reception Point |
| TTI | Transmission Time Interval |

TABLE 1-continued

| Acronym | Term or Phrase |
|---|---|
| UE | User Equipment |
| UL | Uplink |
| UL-SCH | Uplink Shared Channel |
| UPF | User Plane Function |
| URLLC | Ultra-Reliable and Low Latency Communications |
| UTC | Coordinated Universal Time |

General Architecture

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

FIG. 1A illustrates one embodiment of an example communications system 100 in which the methods and apparatuses described and claimed herein may be embodied. As shown, the example communications system 100 may include wireless transmit/receive units (WTRUs) 102*a*, 102*b*, 102*c*, and/or 102*d* (which generally or collectively may be referred to as WTRU 102), a radio access network (RAN) 103/104/105/103*b*/104*b*/105*b*, a core network 106/

107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 1A-1E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 1A may be configured to communicate with the base station 114a, which may employ a cellular-based radio technology, and with the base station 114c, which may employ an IEEE 802 radio technology.

Figure 1B:
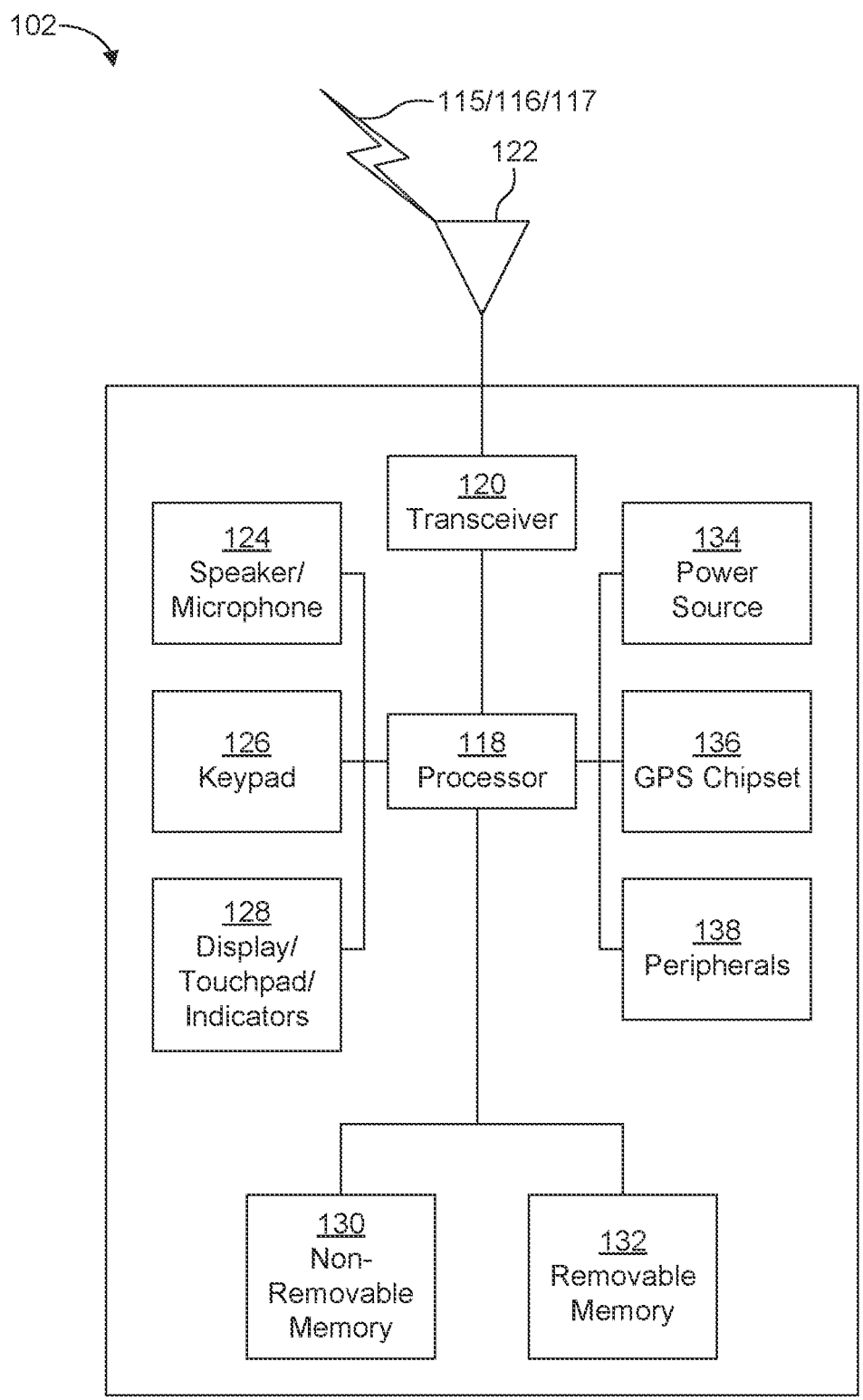
FIG. 1B illustrates an exemplary apparatus configured for wireless communication according to an embodiment.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to, transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 1C:
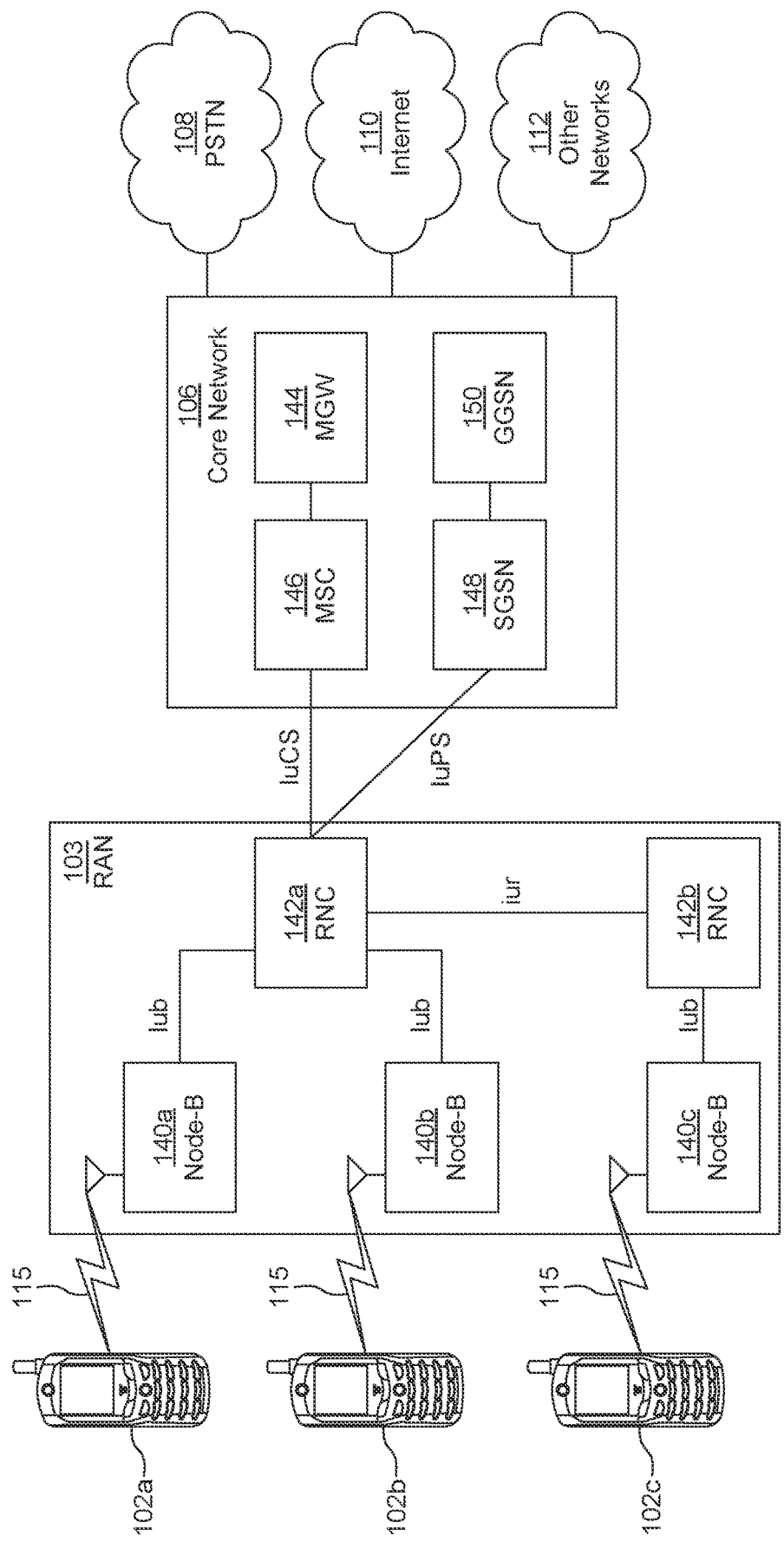
FIG. 1C illustrates a system diagram of a radio access network and a core network according to an embodiment.

FIG. 1C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between the WTRUs 102a, 102b, 102c and IP-enabled devices.

As noted above, the core network 106 may also be connected to the networks 112, which may include other wired or wireless networks that are owned and/or operated by other service providers.

Figure 1D:
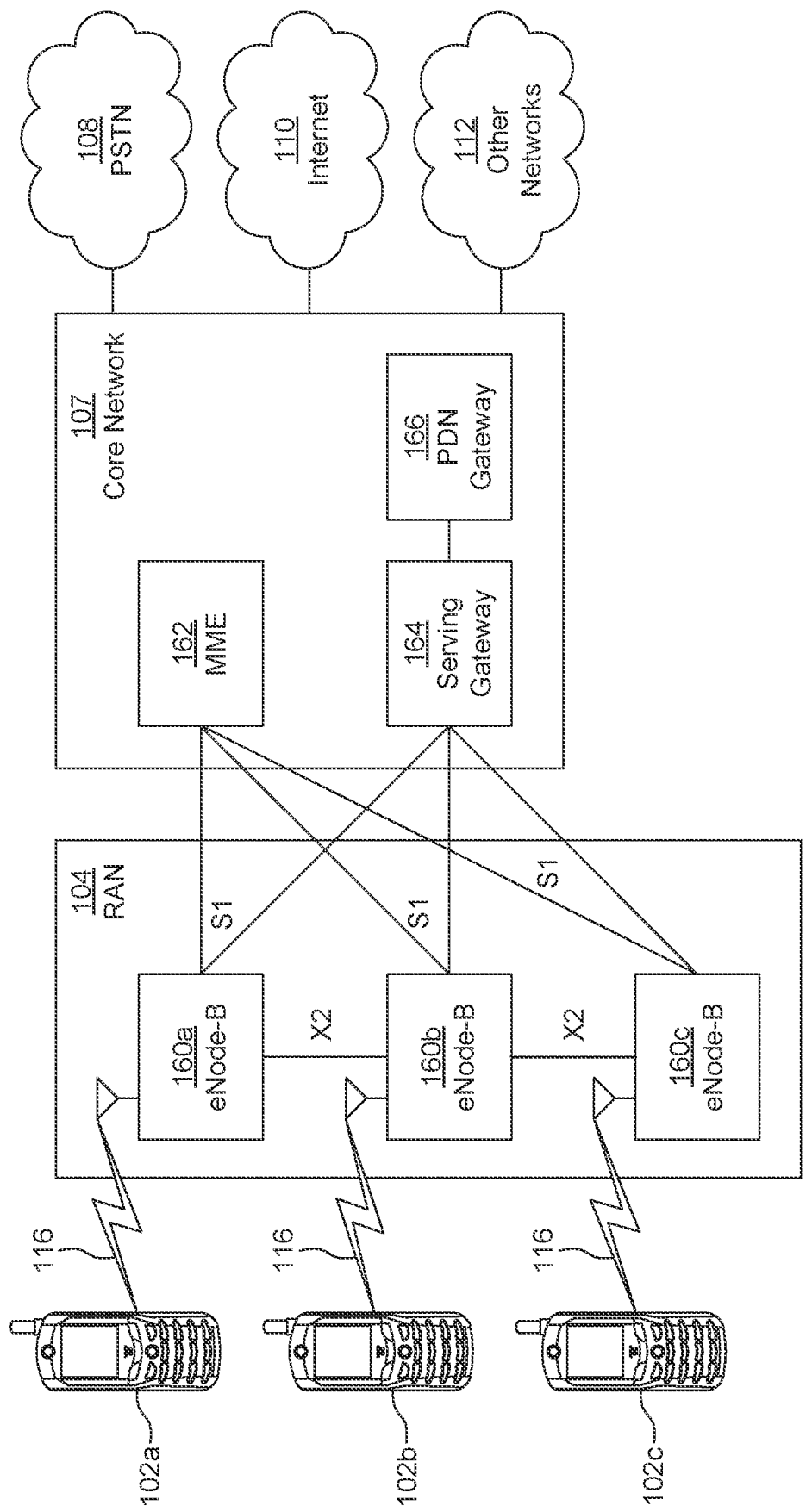
FIG. 1D illustrates a system diagram of a radio access network and a core network according to another embodiment.

FIG. 1D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
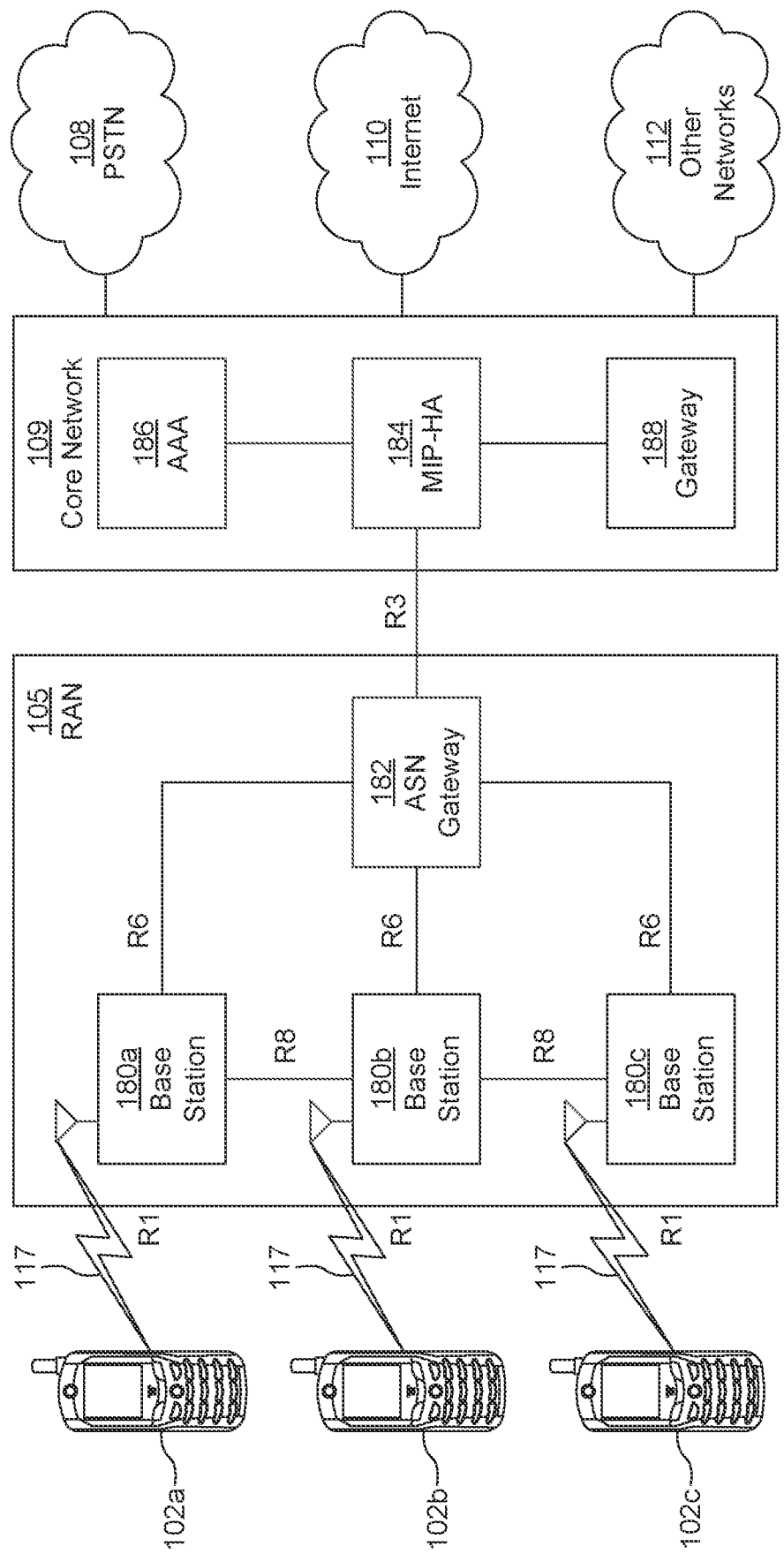
FIG. 1E illustrates a system diagram of a radio access network and a core network according to yet another embodiment.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1F:
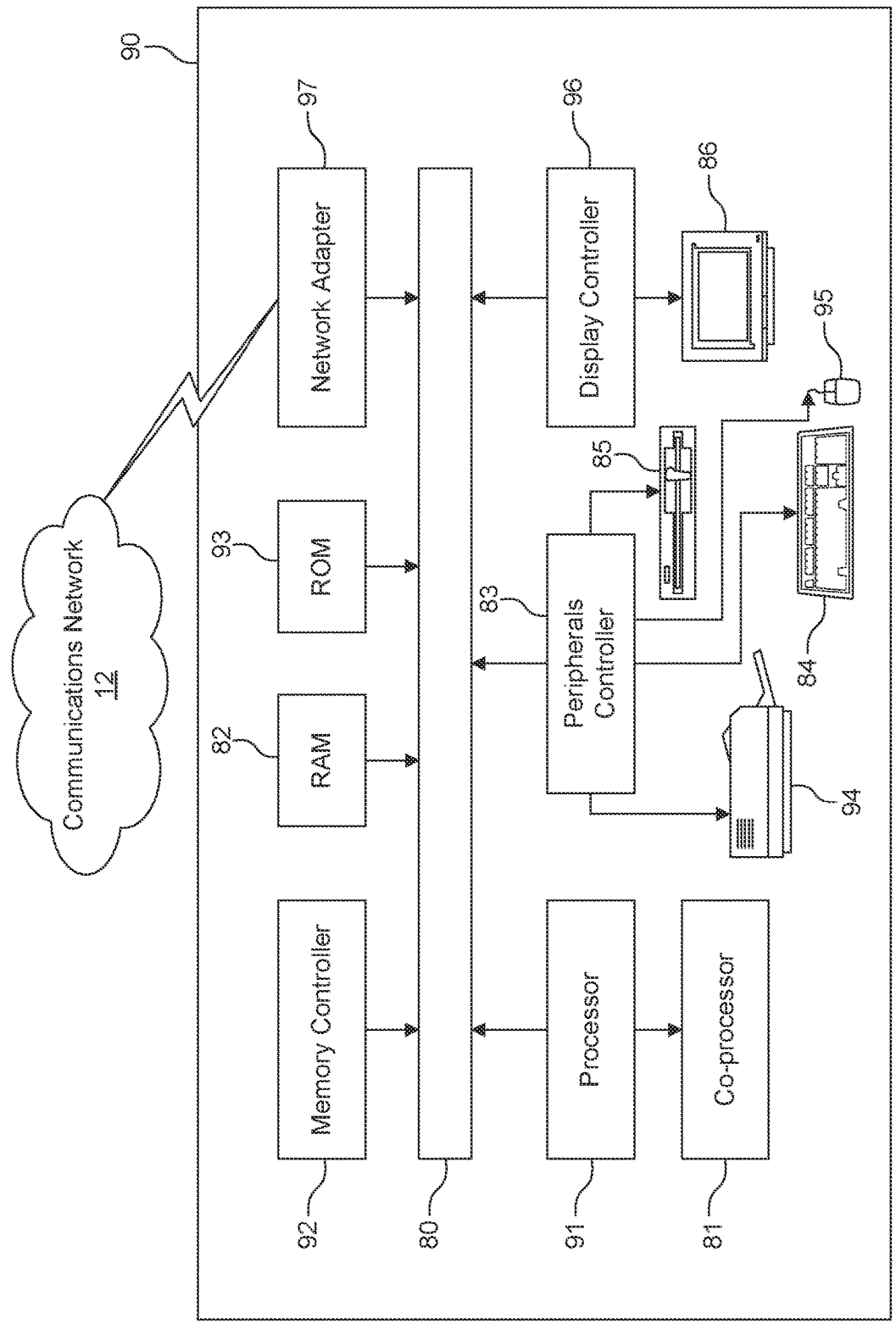
FIG. 1F illustrates a block diagram of an exemplary computing system in communication with one or more networks previously shown in FIGS. 1A, 1C, 1D and 1E according to an embodiment.

FIG. 1F is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

NextGen Network Requirements

3GPP TR 38.913 defines scenarios and requirements for next generation access technologies. The Key Performance Indicators (KPIs) for eMBB, URLLC and mMTC devices are summarized in Table 2.

TABLE 2

| Device | KPI | Description | Requirement |
|---|---|---|---|
| eMBB | Peak data rate | Peak data rate is the highest theoretical data rate which is the received data bits assuming error-free conditions assignable to a single mobile station, when all assignable radio resources for the corresponding link direction are utilized (i.e., excluding radio resources that are used for physical layer synchronization, reference signals or pilots, guard bands and guard times). | 20 Gbps for downlink and 10 Gbps for uplink |
| | Mobility interruption time | Mobility interruption time means the shortest time duration supported by the system during which a user terminal cannot exchange user plane packets with any base station during transitions. | 0 ms for intra-system mobility |
| | Data Plane Latency | For eMBB value, the evaluation needs to consider all typical delays associated with the transfer of the data packets in an efficient way (e.g. applicable procedural delay when resources are not pre-allocated, averaged HARQ retransmission delay, impacts of network architecture). | 4 ms for UL, and 4 ms for DL |

TABLE 2-continued

| Device | KPI | Description | Requirement |
|---|---|---|---|
| URLLC | Control Plane Latency | Control plane latency refers to the time to move from a battery efficient state (e.g., IDLE) to start of continuous data transfer (e.g., ACTIVE). | 10 ms |
| | Data Plane Latency | For URLLC the target for user plane latency for UL and DL. Furthermore, if possible, the latency should also be low enough to support the use of the next generation access technologies as a wireless transport technology that can be used within the next generation access architecture. | 0.5 ms |
| | Reliability | Reliability can be evaluated by the success probability of transmitting X bytes within 1 ms, which is the time it takes to deliver a small data packet from the radio protocol layer 2/3 SDU ingress point to the radio protocol layer 2/3 SDU point of the radio interface, at a certain channel quality (e.g., coverage-edge). | $1-10^{-5}$ within 1 ms |
| mMTC | Coverage | MaxCL in uplink and downlink between device and Base Station site (antenna connector(s)) for a data rate of 160 bps, where the data rate is observed at the egress/ingress point of the radio protocol stack in uplink and downlink. | 164 dB |
| | UE Battery Life | UE battery life can be evaluated by the battery life of the UE without recharge. For mMTC, UE battery life in extreme coverage shall be based on the activity of mobile originated data transfer consisting of 200 bytes UL per day followed by 20 bytes DL from MaxCL of 164 dB, assuming a stored energy capacity of 5 Wh. | 15 years |
| | Connection Density | Connection density refers to total number of devices fulfilling specific Quality of Service (QoS) per unit area (per $km^2$). QoS definition should take into account the amount of data or access request generated within a time t_gen that can be sent or received within a given time, t_sendrx, with x % probability. | $10^6$ devices/$km^2$ |

LTE Random Access Procedure

In LTE, the random access procedure is performed for the following events: Initial access from RRC_IDLE; RRC Connection Re-establishment procedure; Handover; DL data arrival during RRC_CONNECTED requiring random access procedure (e.g., when UL synchronization status is "non-synchronized"); UL data arrival during RRC_CONNECTED requiring random access procedure (e.g., when UL synchronization status is "non-synchronized" or there are no PUCCH resources for SR available); and for positioning purpose during RRC_CONNECTED requiring random access procedure (e.g., when timing advance is needed for UE positioning).

The random access procedure takes two distinct forms: Contention based (applicable to first five events); and Non-contention based (applicable to only handover, DL data arrival, positioning and obtaining timing advance alignment for a Secondary Timing Advance Group (sTAG)).

Figure 2:
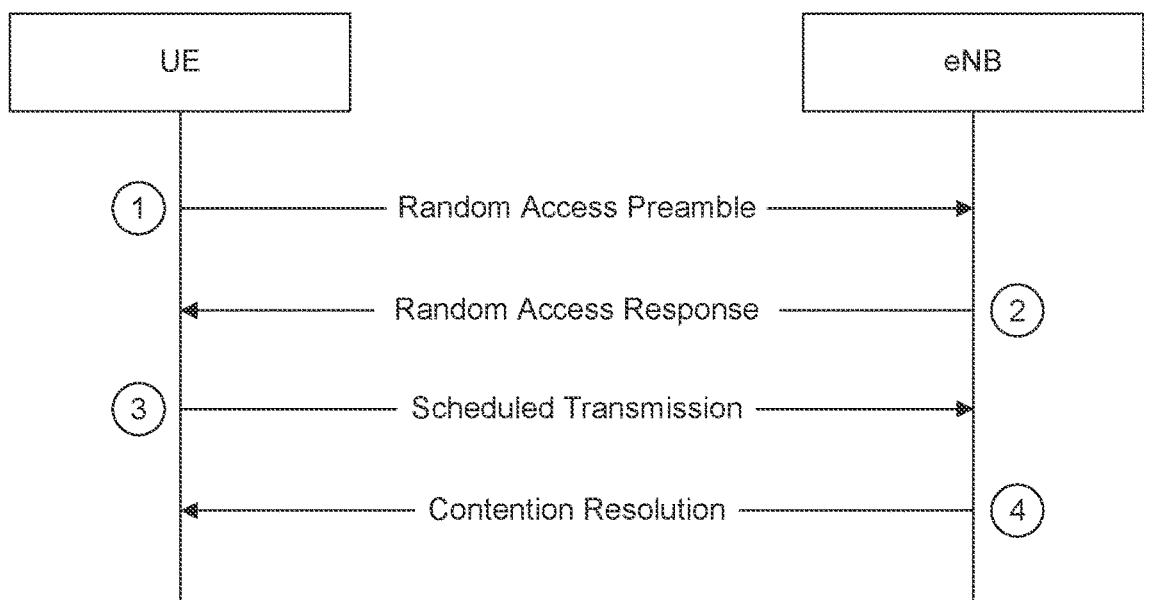
FIG. 2 illustrates a contention based random access procedure.

Contention based random access uses a 4-step procedure as shown FIG. 2. Each of the four steps is denoted by an Arabic numeral as follows:

1. Random Access Preamble on RACH in uplink. Transmission of RACH preamble, allowing eNB to estimate the transmission timing of the UE.

2. Random Access Response generated by MAC on DL-SCH. Network transmits a timing advance command to adjust the UE transmit timing. The network also assigns UL resources to the UE to be used in Step 3.

3. First scheduled UL transmission on UL-SCH. Transmission of the mobile-terminal identity to the network using the UL-SCH.

4. Contention Resolution on DL. Transmission of a contention-resolution message from the network to the UE on the DL-SCH.

Contention-free random access is only used for re-establishing uplink synchronization upon downlink data arrival, handover and positioning. Only the first two steps of the procedure above are applicable, as there is no need for contention resolution when performing the contention-free random access procedure.

A more detailed description of the random access procedure from the PHY and MAC layer perspectives is available in 3GPP TS 36.213 and 3GPP TS 36.321 respectively.

The Physical Random Access Channel (PRACH) configuration in the system and the generic random access parameters are specified in the PRACH-Config and RACH-ConfigCommon IEs of SIB2 shown below.

```
-- ASN1START
RACH-ConfigCommon ::=   SEQUENCE {
    preambleInfo                SEQUENCE {
        numberOfRA-Preambles        ENUMERATED {
                                        n4, n8, n12, n16 ,n20, n24, n28,
                                        n32, n36, n40, n44, n48, n52, n56,
                                        n60, n64},
        preamblesGroupAConfig       SEQUENCE {
            sizeOfRA-PreamblesGroupA    ENUMERATED {
                                            n4, n8, n12, n16 ,n20, n24, n28,
                                            n32, n36, n40, n44, n48, n52, n56,
                                            n60},
```

```
            messageSizeGroupA                ENUMERATED {b56, b144, b208, b256},
            messagePowerOffsetGroupB         ENUMERATED {
                                                minusinfinity, dB0, dB5, dB8, dB10, dB12,
                                                dB15, dB18},
            ...
        }    OPTIONAL                                              -- Need OP
    },
    powerRampingParameters          PowerRampingParameters,
    ra-SupervisionInfo              SEQUENCE {
        preambleTransMax                PreambleTransMax,
        ra-ResponseWindowSize           ENUMERATED {
                                            sf2, sf3, sf4, sf5, sf6, sf7,
                                            sf8, sf10},
        mac-ContentionResolutionTimer   ENUMERATED {
                                            sf8, sf16, sf24, sf32, sf40, sf48,
                                            sf56, sf64}
    },
    maxHARQ-Msg3Tx                  INTEGER (1..8),
    ...
}
RACH-ConfigCommon-v1250 ::=     SEQUENCE {
    txFailParams-r12            SEQUENCE {
        connEstFailCount-r12            ENUMERATED {n1, n2, n3, n4},
        connEstFailOffsetValidity-r12   ENUMERATED {s30, s60, s120, s240,
                                                    s300, s420, s600, s900},
        connEstFailOffset-r12           INTEGER (0..15)  OPTIONAL-- Need OP
    }
}
RACH-ConfigCommonSCell-r11 ::=  SEQUENCE {
    powerRampingParameters-r11      PowerRampingParameters,
    ra-SupervisionInfo-r11          SEQUENCE {
        preambleTransMax-r11            PreambleTransMax
    },
    ...
}
PowerRampingParameters ::=      SEQUENCE {
    powerRampingStep                ENUMERATED {dB0, dB2,dB4, dB6},
    preambleInitialReceivedTargetPower   ENUMERATED {
                                            dBm-120, dBm-118, dBm-116, dBm-114, dBm-112,
                                            dBm-110, dBm-108, dBm-106, dBm-104, dBm-102,
                                            dBm-100, dBm-98, dBm-96, dBm-94,
                                            dBm-92, dBm-90}
}
PreambleTransMax ::=            ENUMERATED {
                                    n3, n4, n5, n6, n7, n8, n10, n20, n50,
                                    n100, n200}
-- ASN1STOP
-- ASN1START
PRACH-ConfigSIB ::=     SEQUENCE {
    rootSequenceIndex       INTEGER (0..837),
    prach-ConfigInfo        PRACH-ConfigInfo
}
PRACH-Config ::=        SEQUENCE {
    rootSequenceIndex       INTEGER (0..837),
    prach-ConfigInfo        PRACH-ConfigInfo            OPTIONAL-- Need ON
}
PRACH-ConfigSCell-r10 ::=       SEQUENCE {
    prach-ConfigIndex-r10       INTEGER (0..63)
}
PRACH-ConfigInfo ::=    SEQUENCE {
    prach-ConfigIndex       INTEGER (0..63),
    highSpeedFlag           BOOLEAN,
    zeroCorrelationZoneConfig   INTEGER (0..15),
    prach-FreqOffset        INTEGER (0..94)
}
-- ASN1STOP
```

The IE RACH-ConfigDedicated is used to specify the dedicated random access parameters as shown below.

```
-- ASN1START
RACH-ConfigDedicated ::=      SEQUENCE {
    ra-PreambleIndex              INTEGER (0..63),
    ra-PRACH-MaskIndex            INTEGER (0..15)
}
-- ASN1STOP
```

The PRACH mask index values are defined in Table 3 below.

TABLE 3

| PRACH Mask Index | Allowed PRACH (FDD) | Allowed PRACH (TDD) |
|---|---|---|
| 0 | All | All |
| 1 | PRACH Resource Index 0 | PRACH Resource Index 0 |
| 2 | PRACH Resource Index 1 | PRACH Resource Index 1 |
| 3 | PRACH Resource Index 2 | PRACH Resource Index 2 |
| 4 | PRACH Resource Index 3 | PRACH Resource Index 3 |
| 5 | PRACH Resource Index 4 | PRACH Resource Index 4 |
| 6 | PRACH Resource Index 5 | PRACH Resource Index 5 |
| 7 | PRACH Resource Index 6 | Reserved |
| 8 | PRACH Resource Index 7 | Reserved |
| 9 | PRACH Resource Index 8 | Reserved |
| 10 | PRACH Resource Index 9 | Reserved |
| 11 | Every, in the time domain, even PRACH opportunity 1$^{st}$ PRACH Resource Index in subframe | Every, in the time domain, even PRACH opportunity 1$^{st}$ PRACH Resource Index in subframe |
| 12 | Every, in the time domain, odd PRACH opportunity 1$^{st}$ PRACH Resource Index in subframe | Every, in the time domain, odd PRACH opportunity 1$^{st}$ PRACH Resource Index in subframe |
| 13 | Reserved | 1$^{st}$ PRACH Resource Index in subframe |
| 14 | Reserved | 2$^{nd}$ PRACH Resource Index in subframe |
| 15 | Reserved | 3$^{rd}$ PRACH Resource Index in subframe |

NR Beamformed Access

Currently, 3GPP standardization's efforts are underway to design the framework for beamformed access. The characteristics of the wireless channel at higher frequencies are significantly different from the sub-6 GHz channel that LTE is currently deployed on. The key challenge of designing the new Radio Access Technology (RAT) for higher frequencies will be in overcoming the larger path-loss at higher frequency bands. In addition to this larger path-loss, the higher frequencies are subject to an unfavorable scattering environment due to blockage caused by poor diffraction. Therefore, MIMO/beamforming is essential in guaranteeing sufficient signal level at the receiver end.

Relying solely on MIMO digital precoding used by digital BF to compensate for the additional path-loss in higher frequencies seems not enough to provide similar coverage as below 6 GHz. Thus, the use of analog beamforming for achieving additional gain can be an alternative in conjunction with digital beamforming. A sufficiently narrow beam should be formed with lots of antenna elements, which is likely to be quite different from the one assumed for the LTE evaluations. For large beamforming gain, the beam-width correspondingly tends to be reduced, and hence the beam with the large directional antenna gain cannot cover the whole horizontal sector area specifically in a 3-sector configuration. The limiting factors of the number of concurrent high gain beams include the cost and complexity of the transceiver architecture.

Figure 3:
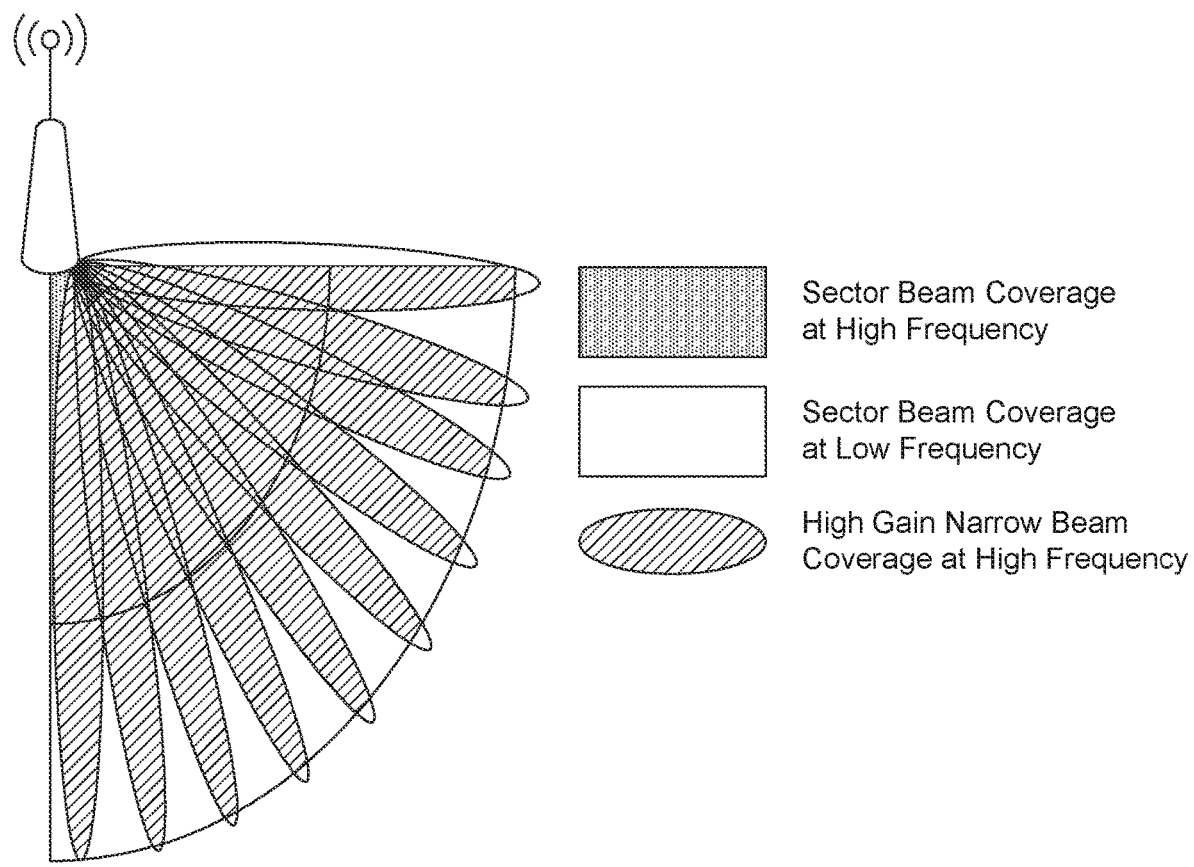
FIG. 3 illustrates cell coverage with sector beams and multiple high gain narrow beams.

From these observations above, multiple transmissions in time domain with narrow coverage beams steered to cover different serving areas are necessary. Inherently, the analog beam of a subarray can be steered toward a single direction at the time resolution of an OFDM symbol or any appropriate time interval unit defined for the purpose of beam steering across different serving areas within the cell, and hence the number of subarrays determines the number of beam directions and the corresponding coverage on each OFDM symbol or time interval unit defined for the purpose of beams steering. In some literature, the provision of multiple narrow coverage beams for this purpose has been called "beam sweeping". For analog and hybrid beamforming, the beam sweeping seems to be essential to provide the basic coverage in NR. This concept is illustrated in FIG. 3 where the coverage of a sector level cell is achieved with sectors beams and multiple high gain narrow beams. Also, for analog and hybrid beamforming with massive MIMO, multiple transmissions in time domain with narrow coverage beams steered to cover different serving areas is essential to cover the whole coverage areas within a serving cell in NR.

One concept closely related to beam sweeping is the concept of beam pairing which is used to select the best beam pair between a UE and its serving cell, which can be used for control signaling or data transmission. In some embodiments, the best beam pair may include a beam pair above a predetermined threshold. For the downlink transmission, a beam pair will consist of UE RX beam and NR-Node TX beam while for uplink transmission, a beam pair will consist of UE TX beam and NR-Node RX beam.

Another related concept is the concept of beam training which is used for beam refinement. For example, as illustrated in FIG. 3, a coarser sector beamforming may be applied during the beam sweeping and sector beam pairing procedure. A beam training may then follow where for example the antenna weights vector is refined, followed by the pairing of high gain narrow beams between the UE and NR-Node.

NR System Information

Figure 4:
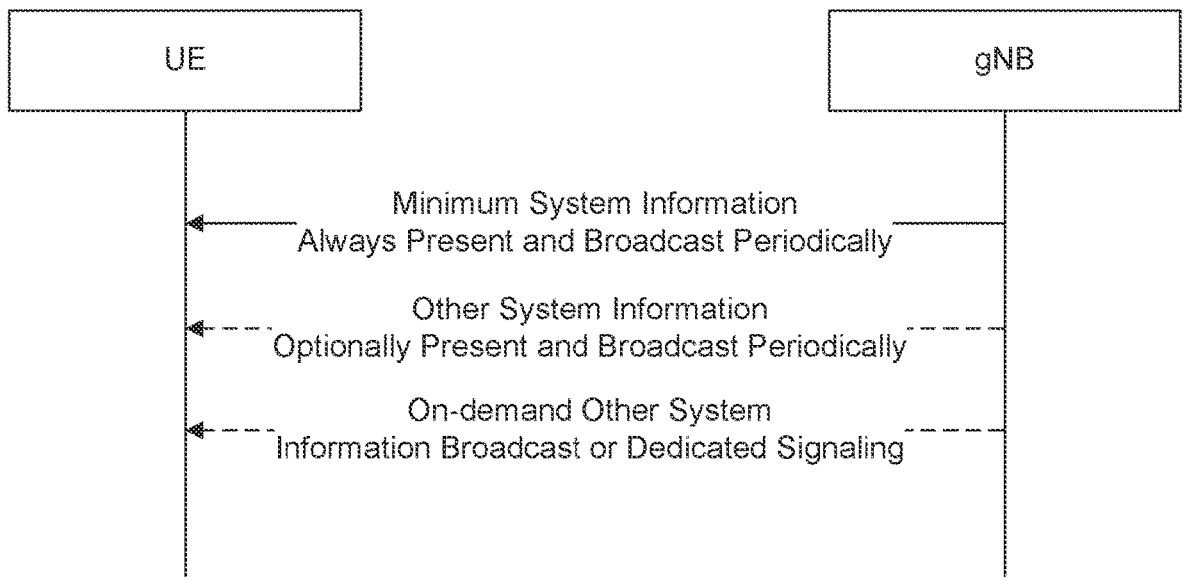
FIG. 4 illustrates an embodiment of system information provisioning in NR.

System Information (SI) is divided into Minimum SI and Other SI. Minimum SI is periodically broadcast and comprises basic information required for initial access and information for acquiring any other SI broadcast periodically or provisioned on-demand, i.e. scheduling information. The Other SI encompasses everything not broadcast in the Minimum SI and may either be broadcast, or provisioned in a dedicated manner, either triggered by the network or upon request from the UE as illustrated in FIG. 4.

For UEs in RRC_CONNECTED, dedicated RRC signaling is used for the request and delivery of the Other SI. For UEs in RRC_IDLE and RRC_INACTIVE, the request triggers a random access procedure and is carried over MSG3 unless the requested SI is associated to a subset of the PRACH resources, in which case MSG1 can be used. When MSG1 is used, the minimum granularity of the request is one SI message (i.e., a set of SIBs) and one RACH preamble can be used to request multiple SI messages. The gNB acknowledges the request in MSG2.

The Other SI may be broadcast at a configurable periodicity and for a certain duration. It is a network decision whether the other SI is broadcast or delivered through dedicated and UE specific RRC signaling. Each cell on which the UE is allowed to camp broadcasts at least some contents of the Minimum SI, while there may be cells in the system on which the UE cannot camp and do not broadcast the Minimum SI.

For a cell/frequency that is considered for camping by the UE, the UE is not required to acquire the contents of the minimum SI of that cell/frequency from another cell/frequency layer. This does not preclude the case that the UE applies stored SI from previously visited cell(s). If the UE cannot determine the full contents of the minimum SI of a cell (by receiving from that cell or from valid stored SI from previous cells), the UE shall consider that cell as barred.

When multiple numerologies are mixed on a single carrier, only the default one is used for system information broadcast and paging. FFS is whether initial access from RRC_INACTIVE also relies on the default numerology.

NR UE States and State Transitions

A UE is either in RRC_CONNECTED state or in RRC_INACTIVE state when an RRC connection has been established. If this is not the case, i.e. no RRC connection is established, the UE is in RRC_IDLE state. The RRC states can further be characterized as follows:

1. During RRC_IDLE, the following may occur:
  a UE specific DRX may be configured by upper layers;
  UE controlled mobility based on network configuration;
  The UE: Monitors a Paging channel; Performs neighboring cell measurements and cell (re-)selection; and Acquires system information.
2. During RRC_INACTIVE, the following may occur:
  A UE specific DRX may be configured by upper layers or by RRC layer;
  UE controlled mobility based on network configuration;
  The UE stores the AS context;
  The UE: Monitors a Paging channel; Performs neighboring cell measurements and cell (re-)selection; Performs RAN-based notification area updates when moving outside the RAN-based notification area (FFS Whether a RAN-based notification area is always configured or not; and FFS UE behavior if it is decided that a RAN-based notification area is not always configured); and Acquires system information.
3. During RRC_CONNECTED, the following occur:
  The UE stores the AS context;
  Transfer of unicast data to/from UE;
  At lower layers, the UE may be configured with a UE specific DRX;
  For UEs supporting CA, use of one or more SCells, aggregated with the PCell, for increased bandwidth;
  For UEs supporting DC, use of one SCG, aggregated with the MCG, for increased bandwidth;
  Network controlled mobility, i.e. handover within NR and to/from E-UTRAN;
  The UE: Monitors a Paging channel; Monitors control channels associated with the shared data channel to determine if data is scheduled for it; Provides channel quality and feedback information; Performs neighboring cell measurements and measurement reporting; Acquires system information.

Figure 5:
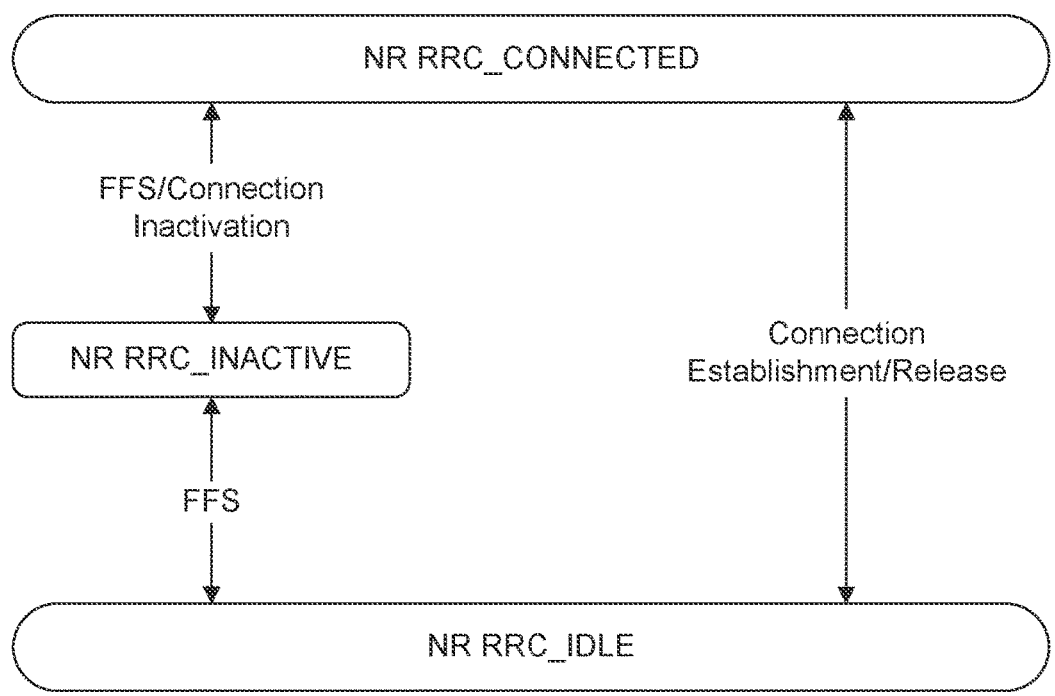
FIG. 5 illustrates UE state machine and state transitions in NR.

As shown in FIG. 5, an overview of UE RRC state machine and state transitions in NR is provided. A UE has only one RRC state in NR at one time.

Figure 6:
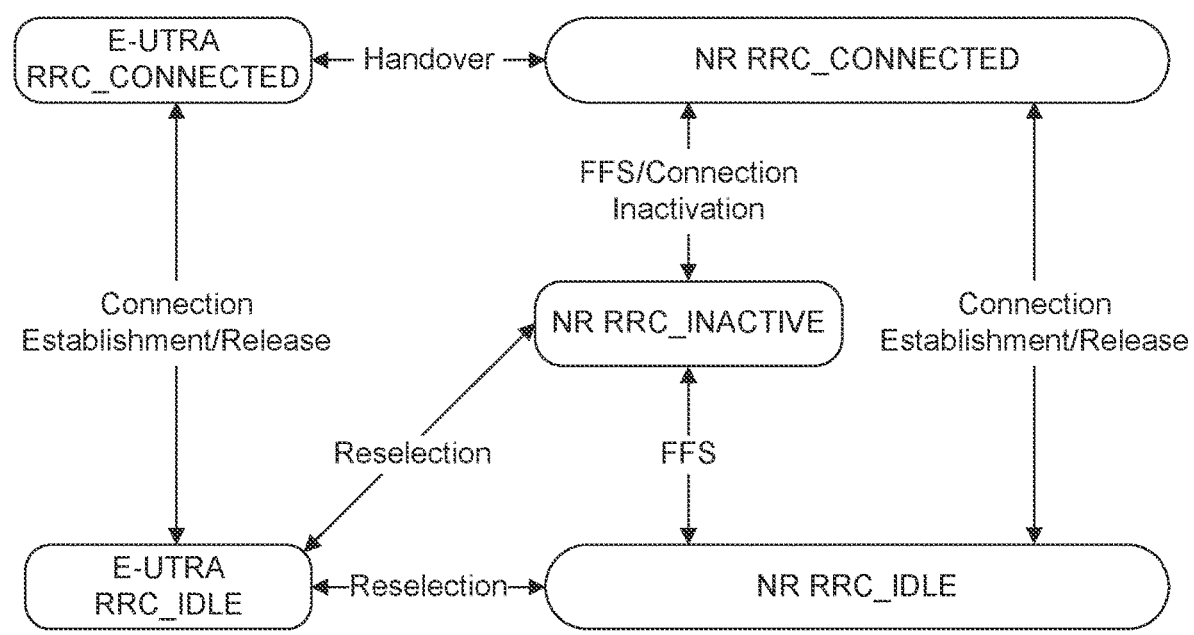
FIG. 6 illustrates UE state machine and state transitions between NR/NGC and E-UTRAN/EPC.

FIG. 6 illustrates an overview of UE state machine and state transitions in NR as well as the mobility procedures supported between NR/NGC and E-UTRAN/EPC. The UE state machine, state transition and mobility procedures between NR/NGC and E-UTRA/NGC are FFS.

NR Mobility in RRC_CONNECTED

Network controlled mobility applies to UEs in RRC_CONNECTED and is categorized into two types of mobility: cell level mobility and beam level mobility. Cell level mobility requires explicit RRC signaling to be triggered, i.e. handover. Beam level mobility does not require explicit RRC signaling to be triggered—it is dealt with at lower layers—and RRC is not required to know which beam is being used at a given point in time.

Figure 7:
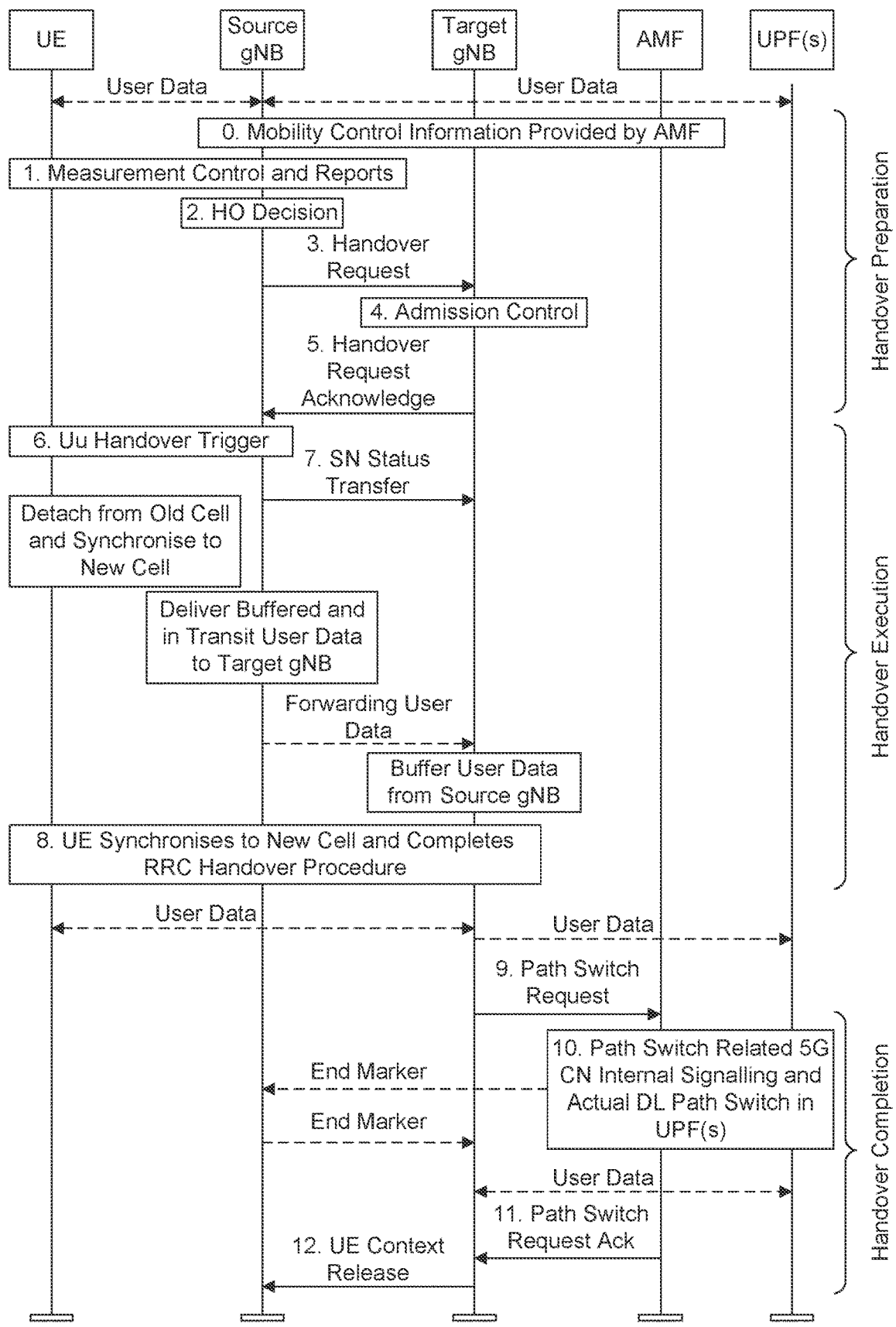
FIG. 7 illustrates Intra-AMF/UPF Handover.

FIG. 7 illustrates the C-plane handling of the basic handover scenario where neither the AMF nor the UPF changes. Each of the steps in FIG. 7 is denoted by an Arabic numeral as follows:

0. The UE context within the source gNB contains information regarding roaming and access restrictions which were provided either at connection establishment or at the last TA update.
1. The source gNB configures the UE measurement procedures and the UE reports according to the measurement configuration.
2. The source gNB decides to handover the UE, based on MEASUREMENT REPORT and RRM information.
3. The source gNB issues a HANDOVER REQUEST message to the target gNB passing necessary information to prepare the HO at the target side
4. Admission Control may be performed by the target gNB.
5. The target gNB prepares HO with L1/L2 and sends the HANDOVER REQUEST ACKNOWLEDGE to the source gNB.
6. The target gNB generates the RRC message to perform the handover.
7. The source gNB sends the SN STATUS TRANSFER message to the target gNB.
8. The UE synchronizes to the target cell and completes the RRC handover procedure.
9. The target gNB sends a PATH SWITCH REQUEST message to AMF to trigger 5GC to switch the DL data path towards the target gNB and to establish an NG-C interface instance towards the target gNB.
10. 5GC switches the DL data path towards the target gNB
11. The AMF confirms the PATH SWITCH REQUEST message with the PATH SWITCH REQUEST ACKNOWLEDGE message.
12. By sending the UE CONTEXT RELEASE message, the target gNB informs the source gNB about the success of HO and triggers the release of resources by the source gNB. The target gNB sends this message after the PATH SWITCH REQUEST ACKNOWLEDGE message is received from the AMF. Upon reception of the UE CONTEXT RELEASE message, the source gNB can release radio and C-plane related resources associated to the UE context. Any ongoing data forwarding may continue.

According to another embodiment, beam management is defined as follows in NR:

Beam management: a set of L1/L2 procedures to acquire and maintain a set of TRP(s) and/or UE beams that can be used for DL and UL transmission/reception, which include at least following aspects:

Beam determination: for TRP(s) or UE to select of its own Tx/Rx beam(s).

Beam measurement: for TRP(s) or UE to measure characteristics of received beamformed signals.

Beam reporting: for UE to report information a property/quality of beamformed signal(s) based on beam measurement.

Beam sweeping: operation of covering a spatial area, with beams transmitted and/or received during a time interval in a predetermined way.

According to another embodiment, the following DL L1/L2 beam management procedures are supported within one or multiple TRPs:

P-1: is used to enable UE measurement on different TRP Tx beams to support selection of TRP Tx beams/UE Rx beam(s). For beamforming at TRP, it typically includes a intra/inter-TRP Tx beam sweep from a set of different beams. For beamforming at UE, it typically includes a UE Rx beam sweep from a set of different beams.

P-2: is used to enable UE measurement on different TRP Tx beams to possibly change inter/intra-TRP Tx beam(s); From a possibly smaller set of beams for beam refinement than in P-1. Note that P-2 can be a special case of P-1.

P-3: is used to enable UE measurement on the same TRP Tx beam to change UE Rx beam in the case UE uses beamforming.

RAN2 Agreements

In an embodiment, the following agreements related to measurement reporting in NR have been made. For Agreements from R2-97b:

1. In NR, as in LTE, it should be possible to include cell quality (e.g. RSRP and/or RSRQ) in the measurement report.

2. UE can indicate the SS block identifier (terminology to be confirmed by RAN1 LS) of x best beams where x is configurable in measurement reports triggered by the events on SS block. Specifically, (i) FFS whether it is needed for all events; (ii) FFS how the UE can choose the best beams; (iii) FFS whether quality of the beams are also reported; and (iv) FFS whether the same applies for CSI-RS.

For Agreements from R2-98:

1: SS block identifier is not included in measurement reporting triggered by CSI-RS events.

2: SS block identifier can be included in measurement reporting triggered by event A1-A6 for measurement reporting triggered by NR-SS events. Specifically (i) FFS: How to select the x best beams to be included in the report; and (ii) FFS Whether x is the same value for the triggered cell and the non-triggered cells.

Another agreement from R2-89 includes:

1: For SS based events, the UE report the beams in the order of quality.

2: CSI-RS identifier can be included in measurement reporting triggered by event A1-A6 for measurement reporting triggered by CSI-RS events 3: for CSI-RS based events, the UE report the beams in the order of quality.

FFS: For A1-A6 events triggered by CSI-RS, the cell quality derived from NR-SS from the same cell can be included in the measurement report if available based on other measurements that have been configured.

Agreements from R2-NR-AH #2 include:

1: Measurement report includes the measurement identity of the associated measurement configuration that triggered the reporting 2: Cell measurement quantities can be included in the measurement report. RAN1 to confirm the cell measurement quantities to be supported.

3: The cell measurement quantities to be included in the measurement report are configurable by the network.

4: maxReportCells is supported to indicate the maximum number of non-serving cells to be reported by the UE (as in LTE).

5: For event triggered reporting: (i) PCell and SCells cell quality are always included in the measurement report; and (ii) Include cells in the cellsTriggeredList in the measurement report (same as LTE). FFS cells to be included according to cellsTriggeredList to be clarified 6 Blacklisted cells, if provided, are not used in event evaluation and reporting (as in LTE).

7 If whitelisted cells are provided, only whitelisted cells are used in event evaluation and reporting (as in LTE).

8 Beam measurements (based on NR-SS and CSI-RS) can be included in the measurement report and can be configured by the network (i.e. network configures the UE to report beam identifier only, beam measurement result and identifier, or no beam reporting)

9: Measurement quantities can be configured by the network for beam measurement reporting. RAN1 to confirm the measurement quantities to be supported. FFS Whether the cell and beam measurement quantities to be reported need to be consistent.

10: For selection of x SS blocks to be included in the measurement report for each cell: (i) x can be configured separately from N (N used in cell quality derivation). FFS how to select the up to x SS blocks to be included.

11: For cell events (A1 to A6 events), selection of y CSI-RS resource is included in the measurement report for each cell: (i) y can be configured separately from N (N used in cell quality derivation). FFS how to select the up to y CSI-RS resource to be included. FFS measurement report content for Cx events. FFS whether to include the cell quality derived from NR-SS for the same cell to be included in a measurement report triggered based on CSI-RS, if the NR-SS measurement is available.

The following agreements related to connected mode mobility in NR have been made. In Agreements from R2-96:

1: NR shall support HO as part of the NR mobility procedures.

2: Network based mobility shall reuse the same principles as LTE (Rel-13) and for inter gNB HO consisting of at least: (i) Source gNB initiates the HO over the Xn interface via a HO request; (ii) Target gNB performs admission control and provides the RRC configuration as part of the HO acknowledgement; (iii) Source gNB provides the configuration to the UE including the HO command via RRC; and (iv) The UE moves the connection to the target gNB via RRC According to another Agreement from R2-96:

1 At least cell id and all information required to access the target cell will be included in the HO command.

2 For at least some cases information required for contention based and contention free access can be included in the HO command 3 To be studied what beam related information of the target cell may be required.

4 Study the possibility of handover where a condition configured by the gNB is used by the UE to determine when it executes the handover.

Yet another embodiment is directed to Agreements from R2-97. In one agreement Access information (e.g. RACH configuration) for the target cell is provided in the HO command to enable the UE to access the cell without reading system information. Access information may include beam specific information (if any).

Yet another embodiment is directed to Agreements from R2-97b:

1. Handover command can contain at least cell identity of the target cell and RACH configuration(s) associated to the beams of the target cell. RACH configuration(s) can include configuration for contention-free random access.

1b. UE selects a suitable beam from all beams of the target cell.

1c. UE performs CBRA on the UE's selected beam if CFRA resources are not provided for the UE's selected beam.

Yet another agreement is directed from R2-NR-AH #2. Here, the Agreement includes:

1 Measurement information (including beam information if there are beams in the network) reported by the UE can be included the HANDOVER REQUEST message sent to the target.

2 The handover command includes all necessary parameters (at least new C-RNTI, target gNB security algorithm identifiers, and optionally a set of dedicated RACH resources (RAN2 understand this could be time/frequency/sequence but decision is up to RAN1), etc.). FFS How the UE uses the set of dedicated RACH resources and common RACH resources. In addition, FFS How the UE knows the common RACH resources.

3 Handover command can include association between RACH resources and SS blocks.

4 Handover command can include association between RACH resources and CSI-RS configuration(s), if RAN1 conclude that such association is possible. FFS How the UE selects the beam and RACH resources to be used to access from the information included in the handover command. This could be specified behavior, or specified behavior with some parameter(s) than can be controlled by the network, and can be discussed is some aspects might be left to UE implementation.

5 Timer based handover failure procedure like LTE (T304) is supported in NR.

6 RRC connection re-establishment procedure should be used for recovering handover failure.

Yet another agreement is directed to R2-99. In this agreement, the information is carried between the source and target node.

1. NR RRC specifications define a transparent RRC container (like the HandoverPreparationInformation message in LTE) to be transmitted from the source gNB to the target gNB as part of the Xn Handover Request message.

2.1 As in LTE, the HandoverPreparationInformation to be transmitted from the source gNB to the target gNB includes the UE capabilities for different RATs 2.2 As in LTE, the HandoverPreparationInformation to be transmitted from the source gNB to the target gNB can include the AS configuration, the RRM configuration and the AS context (including information necessary to handle handover failures). The details of the content of each IE are FFS.

3.1: The AS configuration includes the measurement configuration and radio resource configurations, UE identifier in the source, at least Antenna Info and DL Carrier Frequency. The FFS is whether the AS configuration includes the QoS flow to DRB mapping that was not configured to the UE via RRC signalling. The FFS may need to provide the system information from source equivalent to LTE's MIB, SIB-1 and SIB-2 (some checking of use of this in LTE to be done).

4.1: The RRM configuration can include at least the inactive time.

4.2: As in LTE, to support CA case, the RRM configuration can include the list of best cells on each frequency for which measurement information is available.

5 Available beam measurement information can be part of the RRM configuration of the HandoverPreparationInformation message if beam measurement information (i.e. beam indexes and optionally measurement results) have been configured by the source gNodeB to be reported by a UE. That information is not a mandatory part of the HandoverPreparationInformation message. For the FFS, for which cell(s) beam measurement information can be included e.g. only candidate target cell.

6 The RRM configuration can include both beam measurement information (for layer 3 mobility) associated to SS Block(s) and CSI-RS(s) for the reported cell (or cells depending on outcome of FFS above) if both types of measurements are available.

Agreements can also relate to content of handover command in RRC including the following:

1. The NR RRC specifications define a transparent RRC container (like the Handover Command message in LTE) to be transmitted from the target gNB to the source gNB as part of the Xn Handover Request Acknowledgement message.

2. As in LTE, the handover command should be entirely generated by the target gNB. In FFS, there could be exceptions for this (e.g., for MBB enhancement similar to that in LTE, if supported).

3 The mobilityControlInfo can contain at least the target physical cell identifier (or equivalent defined by RAN1), the carrier frequency, the T304 like timer and the new UE identifier (C-RNTI type of identifier).

4 RAN2 understanding is that the common RACH configuration for beams in the target cell can only be associated to the SS Block(s).

5 RAN2 understanding is that the network can have dedicated RACH configurations associated to the SS Block(s) and/or have dedicated RACH configurations associated to CSI-RS(s) within a cell. In FFS, the target gNB can optionally include the common RACH configuration in the mobilityControlInfo. If not included the UE continues to use the common RACH configuration of the source cell.

6 The target gNB is able to include one of the following RACH configurations in the mobilityControlInfo to enable the UE to access the target cell: i/ Common RACH configuration, ii/ Common RACH configuration+Dedicated RACH configuration associated with SS-Block or iii/ Common RACH configuration+Dedicated RACH configuration associated with CSI-RS. (List of options to be revised if common RACH is concluded to be optional based on above FFS) (Simultaneously including in the mobilityControlInfo a dedicated RACH configuration associated with SS-Block and a dedicated RACH configuration associated with CSI-RS is not supported). FFS whether there will be a fallback procedure using common RACH when dedicated RACH fails.

Agreements can also relate to R2-99b as follows:

1. Dedicated RACH Resources (if provided) where the beam quality measured on the associated NR-SS or CSI-RS is above a threshold are prioritized. Common NR-SS threshold and a dedicated NR-SS/CSI-RS threshold, if required, is configured in handover command.

The order to access the dedicated RACH resources is up to UE implementations.

Agreements for handover and PSCell change involving RACH include:

The UE shall not switch to contention-based RACH resources if there are dedicated RACH resources fulfilling the quality threshold specified above.

The same behavior as for LTE in T304 and T307 is provided here.

Measurement Reporting

In one embodiment, selection of 'x' SS-based best beams to report is described. In case 1, SS based events, for e.g. event A1 to A6 triggered by measurements of SS signals, is described. For SS based beams, the UE selects the x best beams to be included in the measurement report as the best beam and the up to x−1 best beams above absolute configured threshold. The absolute threshold may be based on one or two measurement quantities: an RSRP threshold and an RSRQ threshold. The x best beams may be a subset of the beams used in the cell quality derivation. Further details are captured below.

1. If the configured threshold is RSRP only, then the UE selects the best beam and the up to x−1 beams with the next x−1 largest RSRP values above absolute configured threshold. In this case the best beam is the beam with the highest measured RSRP value. Ties are resolved as follow: in one embodiment, the UE performs a random ranking between beams bi and bj. Alternatively, between two tied beams, the UE selects as better beam, the beam with the largest number of CSR-RS based beams with quality above absolute configured threshold is considered to be higher ranked i.e. better beam. The quantity for the CSI-RS based quality evaluation may be RSRP, RSRQ or both.

2. If the configured threshold is RSRQ only, then the UE selects the best beam and the up to x−1 beams with the next x−1 largest RSRQ values. In this case the best beam is the beam with the highest measured RSRQ value. Ties are resolved as follow: in one embodiment, the UE performs a random ranking between beams bi and bj. Alternatively, between two ties beams, the UE selects as better beam, the beam with the largest number of CSR-RS based beams with quality above absolute configured threshold is considered to be higher ranked i.e. better beam. The quantity for the CSI-RS based quality evaluation may be RSRP, RSRQ or both.

3. If the configured threshold has both RSRP threshold value and RSRQ threshold value, the UE may apply the following criteria for the selection of the x best beams to report:

a. The UE ranks the N beams used in the evaluation of the cell quality as follows: beam bi is better than beam bj if RSRP(bi)≥RSRP(bj) and RSRQ(bi)≥RSRQ(bj). The best beam is the beam with the highest rank. The UE then selects the remaining up to x−1 best beams as the next x−1 highest ranked beams with quality above a configured threshold in terms of both RSRP quantity and RSRQ quantity. In order to address scenarios where there are ties for ranking between beam bi and beam bj, we define tie as follow:

b. Beams bi and bj are tie for ranking as defined above, as per one of the following situations: RSRP(bi)=RSRP(bj) and RSRQ(bi)=RSRQ(bj) or RSRP(bi)>RSRP(bj) and RSRQ(bi)<RSRQ(bj) or RSRP(bi)<RSRP(bj) and RSRQ(bi)>RSRQ(bj).

c. The UE may resolve the tie using one of more of the following approaches:

(i) In one embodiment, the UE may be configured with a secondary ranking criteria as follow: beam bi is ranked higher than beam bj i.e. beam bi is better beam than bj if RSRP(bi)>RSRP(bj). Alternative criteria may be beam bi is ranked higher than beam bj if RSRQ(bi)>than RSRQ(bj).

(ii) In another embodiment, the UE performs a random ordering between bi and bj or alternatively, between two beams, the UE selects as better beam, the beam with the largest number of CSR-RS based beams with quality above absolute configured threshold is considered to be higher ranked i.e. better beam. The quantity for the CSI-RS based quality evaluation may be RSRP, RSRQ or both.

In case 2, CSI-RS based events, e.g., events A1 to A6 triggered by measurements of CSI-RS, are described. In one embodiment, the UE selected the x SS based best beams to include in the measurement report as follow:

1. First the UE selects the y CSI-RS based best beams as per the procedure described above for Case 1. The parameter y may be the configured number of CSI-RS based best beam to be included in the measurement reports.

2. The UE selects as the up to x best SS based beams to report, the SS based beams that correspond to the up to 'y' best CSI-RS based bests beam i.e. the up to 'x' SS based beams which contains the up to 'y' best CSI-RS based beams selected above as their narrower beams.

In yet another embodiment, the UE may select up to 'x' SS-based best beams to include in the measurement report, using the procedure described in case 1.

If configured by the network i.e. as per network configuration, the UE includes in the measurement report, the x SS blocks corresponding to the selected x SS based best beams for measurement reporting purpose.

In yet another embodiment, selection of the 'y' best beams associated with CSI-RS is described. In case 1, CSI-RS based events, e.g., events A1 to A6 triggered by measurements of CSI-RS, are described. For CSI-RS based beams, the UE selects they best beams to be included in the measurement report as the best beam and the up to y−1 best beams above absolute configured threshold. The absolute threshold may be based on one or two measurement quantities: an RSRP threshold and an RSRQ threshold. The y best beams may be a subset of the beams used in the cell quality derivation. Further details are captured below.

1. If the configured threshold is RSRP only, then the UE reports the best beam and the up to y−1 beams with the next y−1 largest RSRP values above absolute configured threshold. In this case the best beam is the beam with the highest measured RSRP value. The UE resolves ties by performing a random ranking between beams bi and bj.

2. If the configured threshold is RSRQ only, then the UE reports the best beam and the up to y−1 beams with the next y−1 largest RSRQ values. In this case the best beam is the beam with the highest measured RSRQ value. The UE resolves ties by performing a random ranking between beams bi and bj.

3. If the configured threshold has both RSRP threshold value and RSRQ threshold value, the UE may apply the following criteria for the selection of the y best beams to report:

a. The UE ranks the N beams used in the evaluation of the cell quality as follows: beam bi is better than beam bj if RSRP(bi)>RSRP(bj) and RSRQ(bi)>RSRQ(bj). The best beam is the beam with the highest rank. The UE then selects the remaining up to y−1 best beams as the next y−1 highest ranked beams with quality above a configured threshold in terms of both RSRP quantity and RSRQ quantity. In order to address scenarios where there ties for ranking between beam bi and beam bj, we define tie as follow:

b. Beams bi and bj are tie for ranking as defined above, as per one of the following situations: RSRP(bi)=RSRP(bj) and RSRQ(bi)=RSRQ(bj) or RSRP(bi)>RSRP(bj) and RSRQ(bi)<RSRQ(bj) or RSRP(bi)<RSRP(bj) and RSRQ(bi)>RSRQ(bj).

c. The UE may resolve the tie using one of more of the following approaches:

(i) In one embodiment, the UE may be configured with a secondary ranking criteria as follow: beam bi is ranked higher than beam bj i.e. beam bi is better beam than bj if RSRP(bi)>RSRP(bj). Alternative criteria may be beam bi is ranked higher than beam bj if RSRQ(bi)>than RSRQ(bj).

(ii) In another embodiment, The UE resolves ties by performing a random ranking between beams bi and bj.

According to Case 2, SS based events, e.g., event A1 to A6 triggered by measurements of SS signals, are described. In one embodiment, the UE selected the y CSI-RS based best beams to include in the measurement report as follows:

1. First the UE selects the x SS based best beams as per the procedure described above. The parameter x may be the configured number of SS based best beams to be included in the measurement reports.

2. The UE then selects as the up to 'y' best CSI-RS based beams to report, the CSI-RS based beams that correspond to the up to x best SS based best beams i.e. the up to y CSI-RS based beams, which are narrow beams of the selected best SS based beams.

In another embodiment, the UE may select the up to y CSI-RS based best beams to include in the measurement report, using the procedure described in case 1 of this section.

According to another embodiment, if configured by the network, i.e., as per network configuration, the UE includes in the measurement report, the y CSI-RS resources that correspond to the selected y CSI-RS based best beams for measurement reporting purpose.

PRACH Resource Selection

According to another aspect, solutions are proposed to optimally select the PRACH resource used for access to the target cell from the set of dedicated and/or common PRACH resources configured by the network via dedicated signaling for e.g., the handover command or via broadcast signal.

PRACH resource selection is performed prior to the first Msg1 transmission and any subsequent Msg1 transmissions. Subsequent Msg1 transmissions may occur if the UE receives a Random Access Response (RAR) that includes a Backoff Indicator (BI) subheader or if the Random Access procedure does not complete successfully. For instance, when a Random Access Response (RAR) identified by the RA-RNTI associated with the selected PRACH and containing a Random Access Preamble identifier corresponding to the transmitted PREAMBLE_INDEX was not received during the RAR window.

For NR, the parameters for the dedicated RACH configuration may be signaled in the handover command using an NR-RACH-ConfigDedicated IE such as shown below. In addition to the Preamble Index and PRACH Mask Index parameters, we propose to include parameters for the ID's of the DL beams associated with the dedicated PRACH resource(s). Either an SS Block ID or a CSI-RS Configuration ID parameter is required to be present. It is also possible for both parameters to be present. If the CSI-RS Configuration ID parameter is present, a PRACH configuration associated with the CSI-RS configuration may also be present.

```
-- ASN1START
RACH-ConfigDedicated ::= SEQUENCE {
    ra-PreambleIndex         INTEGER (0..63),
    ra-PRACH-MaskIndex       INTEGER (0..15) OPTIONAL,
    ra-ssBlockId             INTEGER (1..maxSSBlocks)   OPTIONAL, -- cond
ssBlockOrCsi-Rs
    ra-csiRsCfgId            INTEGER (1..maxCSI-RS-Cfg)  OPTIONAL, -- cond
ssBlockOrCsi-Rs    prach-csiRsConfigInfo    PRACH-ConfigInfo       OPTIONAL
-- cond csi-Rs
}
maxSSBlocks              INTEGER ::= 64   -- Maximum number of SS blocks in an SS
burst set
maxCSI-RS-Cfg            INTEGER ::= 32 -- Maximum number of CSI-RS
configurations
-- ASN1STOP
```

TABLE 4

NR-RACH-ConfigDedicated field descriptions ra-PreambleIndex
Explicitly signalled Random Access Preamble for RA Resource selection.
ra-PRACH-MaskIndex
Explicitly signalled PRACH Mask Index for RA Resource selection.
ra-ssBlockId
Explicitly signalled SS block Id for RA Resource selection.
ra-csi-RsCfgId
Explicitly signalled CSI-RS configuration ID for RA Resource selection.
prach-csiRsConfigInfo
Explicitly signalled PRACH configuration associated with CSI-RS configuration for RA Resource selection.

TABLE 5

| Conditional presence | Explanation |
|---|---|
| ssBlockOrCsi-Rs | Either the ra-ssBlockId or the ra-csiRsCfgIdfield mandatory. Both may also be present. |
| csi-Rs | This field is optionally present in the case ra-csiRsCfgId is present. |

An alternate NR-RACH-ConfigDedicated IE where different Preamble Index and PRACH Mask Index parameters may be associated with each beam is shown below.

```
-- ASN1START
RACH-ConfigDedicated ::=  SEQUENCE { SIZE(1..maxDedicatedPRACHResources)
    ra-PreambleIndex            INTEGER (0..63),
    ra-PRACH-MaskIndex          INTEGER (0..15) OPTIONAL,
    ra-beamId                   CHOICE {
        ra-ssBlockId                INTEGER (1..maxSSBlocks),
        ra-csiRsCfgId               INTEGER (1..maxCSI-RS-Cfg)
    }
    prach-csiRsConfigInfo       PRACH-ConfigInfo    OPTIONAL -- cond csi-Rs
}
maxSSBlocks                 INTEGER ::= 64  -- Maximum number of SS blocks in an SS
burst set
maxCSI-RS-Cfg               INTEGER ::= 32 -- Maximum number of CSI-RS
configurations
maxDedicatedPRACHResources      INTEGER ::= 8   -- Maximum number of dedicated
PRACH resources
-- ASN1STOP
```

An alternate NR-RACH-ConfigDedicated IE where the same Preamble Index and PRACH Mask Index parameters associated with each beam are shown below.

```
-- ASN1START
RACH-ConfigDedicated ::=  SEQUENCE {
    ra-PreambleIndex        INTEGER (0..63),
    ra-PRACH-MaskIndex      INTEGER (0..15)  OPTIONAL,
    ra-beam                 SEQUENCE {
SIZE(1..maxDedicatedPRACHResources)
        ra-beamId               CHOICE {
            ra-ssBlockId                INTEGER (1..maxSSBlocks),
            ra-csiRsCfgId               INTEGER (1..maxCSI-RS-Cfg)
        }
        prach-csiRsConfigInfo       PRACH-ConfigInfo    OPTIONAL -- cond csi-
Rs
    }
}
maxSSBlocks                 INTEGER ::= 64   -- Maximum number of SS blocks in an SS
burst set
maxCSI-RS-Cfg               INTEGER ::= 32 -- Maximum number of CSI-RS
configurations
maxDedicatedPRACHResources      INTEGER ::= 8   -- Maximum number of dedicated
PRACH resources
-- ASN1STOP
```

In an alternative embodiment, for the NR-RACH-ConfigDedicated IE, the dedicated RACH configuration may be a Preamble Index. It may alternatively include a list of SSBs where each SSB in the list is associated with a Preamble Index and a list of PRACH resources. It may alternatively include a list of CSI-RS configurations where each CSI-RS configuration in the list is associated with a Preamble Index and list of PRACH resources as shown below.

```
-- ASN1START
RACH-ConfigDedicated ::=            SEQUENCE {
    cfra-Resources                  CFRA-Resources
}
CFRA-Resources ::= CHOICE {
    cfra-Resource           CFRA-Resource,
    cfra-ssb-ResourceList   CFRA-SSB-ResourceList,
    cfra-csirs-ResourceList CFRA-CSIRS-ResourceList
}
CFRA-Resource ::= SEQUENCE {
    ra-PreambleIndex            INTEGER (0..XX)
}
CFRA-SSB-ResourceList ::= SEQUENCE (SIZE(1..maxRAssbResources)OF CFRA-SSB-
Resource
CFRA-CSIRS-ResourceList::= SEQUENCE (SIZE(1..maxRAcsirsResources)OF CFRA-CSIRS-
Resource
CFRA-SSB-Resource::= SEQUENCE {
    ssb     SSB-ID,
    ra-Resource     RA-Resource
}
```

```
-continued

CFRA-CSIRS-Resource ::= SEQUENCE {
    csirs      CSIRS-ID,
    ra-Resource   RA-Resource
}
RA-Resource ::=   SEQUENCE {
    ra-PreambleIndex            INTEGER (0..XX),
    ra-ResourceIndexList        SEQUENCE (SIZE(1..##)) OF
    ra-ResourceIndex            INTEGER (0..YY)
}
maxRAssbResources    INTEGER ::= 64      -- Maximum number of RA resources associated
with SSBs
maxRAcsirsResources  INTEGER ::= 32      -- Maximum number of RA resources assocaited
            with CSI-RS
                                configurations
-- ASN1STOP
```

For NR, the parameters for the common RACH configuration for the target cell may be signaled in the handover command using an NR-RACH-ConfigCommon IE such as the one shown below. For scenarios where the common RACH configuration is not signaled in the handover command, the common RACH configuration for the target cell may be determined using any SI acquisition method defined for NR provided below:

(i) the common RACH configuration for the target cell may be acquired by reading the SI broadcast from the target cell;

(ii) the common RACH configuration for the target cell may be obtained from stored SI that is valid for the target cell;

(iii) if the target cell and source cell are part of the same SI Area, the common RACH configuration for the target cell can be assumed the same as the common RACH configuration for source cell.

criterion used to configure the algorithms. The output of the model is the PRACH resource that is used to access the target cell.

The PRACH resource selection model is composed of two main functions: a suitability check function and a beam & PRACH resource selection function.

The suitability check function determines which of the detected beams of the target cell are suitable for performing random access. The suitability of a beam may be based on a quality threshold, where the threshold may be specified or configured by the network via broadcast and/or dedicated signaling. For embodiments where the threshold is configured by the network, the threshold may be signaled in the NR-RACH-ConfigCommon or NR-RACH-ConfigDedicated IEs. Alternatively, the threshold used for PRACH resource selection could be the same as the threshold used to perform beam selection for the cell quality derivation that is performed for cell (re-)selection or RRM measurements. In

```
-- ASN1START
RACH-ConfigCommon ::=   SEQUENCE {
    cbra-Resources        CBRA-Resources,
    powerRampingParameters      PowerRampingParameters,
    ra-SupervisionInfo    SEQUENCE {
        preambleTransMax          PreambleTransMax,
        ra-ResponseWindowSize     ENUMERATED {
                                    u2, u3, u4, u5, u6, u7, u8, u10},
        ra-ContentionResolutionTimer  ENUMERATED {
                                    u8, u16, u24, u32, u40, u48, u56, u64}
    }
}
CBRA-Resources ::= SEQUENCE {
    numberOfRA-Preambles       NumberOfPreambles,
    preamblesGroupAConfig      SEQUENCE {
        sizeOfRA-PreamblesGroupA   NumberOfPreambles,
        ra-Msg3SizeGroupA          RA-Msg3Sizes,
        -- In LTE there is also a power offset for groupB
        ...
    }     OPTIONAL -- NEED R
}
NumberOfPreambles ::= ENUMERATED {nX, nY}
-- Note: the highest value cannot be used for sizeOfRA-PreamblesGroupA
RA-Msg3Sizes ::= {bX, bY}
PowerRampingParameters ::=           SEQUENCE {
    powerRampingStep              ENUMERATED {dbBX, dBY},
    preambleInitialReceivedTargetPower    ENUMERATED {dBm-X, dBm-Y}
}
-- ASN1STOP
```

Figure 8:
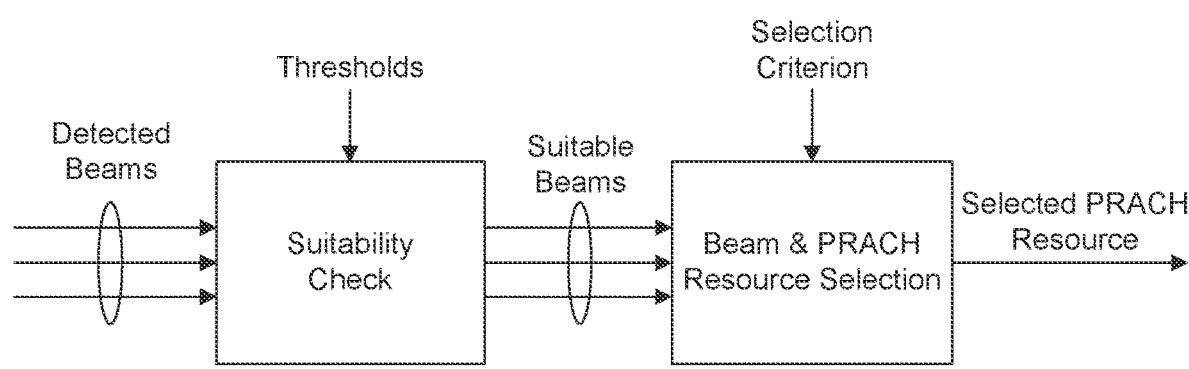
FIG. 8 illustrates a PRACH resource selection model.

FIG. 8 illustrates a model that may be used for PRACH resource selection. The inputs to the model include the detected beams of the target cell and thresholds and selection one embodiment, the threshold is based on RSRP; i.e. detected beams with a corresponding RSRP measurement that is greater than or equal to the threshold are considered suitable. Alternatively, the threshold may be based on RSRQ, SINR, estimated DL or UL data rate(s), CQI or any other measurement quantity defined for NR.

The same threshold may be used when determining the suitability of all beams. Alternatively, separate thresholds may be used, depending on the characteristics of the beams. For example, the threshold used for a beam may be dependent on the type of resource associated with the beam, thereby allowing the selection of suitable beams to be biased towards beams associated with a specific type of resource. In one embodiment, a first threshold, e.g., SSB-threshold, may be used for beams associated with SS blocks and a second threshold, e.g., CSI-RS threshold, may be used for beams associated with CSI-RS configurations. In another embodiment, a 1st threshold may be used for beams associated with dedicated PRACH resources and a second threshold may be used for beams associated with common PRACH resources. To determine which threshold to use if a beam is associated with more than one type of resource, a rule may be specified. For example, if a beam is associated with more than one type of resource, the threshold with the smallest value can be used. In another example, if a beam is associated with dedicated and common PRACH resources, the threshold used for beams associated with dedicated PRACH resource can be used.

In another embodiment, a beam-specific offset is applied when determining the suitability of a beam, thereby allowing the selection of suitable beams to be biased towards a specific beam or group of beams. For example, the beams that are not preferred may be configured with an offset that is less that the offset configured for the preferred beams, thereby requiring the quality of the beams that are not preferred to be better than the preferred beams in order for them to pass the suitability check. The beam-specific offset may also be used when ranking the suitable beams, thereby allowing the preferred beams to be ranked higher.

In another embodiment, the suitability check function is disabled so the beam and PRACH resource selection function can be performed on the detected beams. In the proposed model, this can be accomplished by setting the suitability threshold(s) to an arbitrarily low value such that all detected beams will pass the suitability check.

For scenarios where none of the beams satisfy threshold(s), the PRACH resource selection may be considered not successful and indication of the failure to detect a suitable beam may be sent to higher layers. Alternatively, if none of the beams satisfy the threshold(s), the UE may consider any beam that allows the UE to meet the target received power of the RACH preamble with its maximum transmit power as a suitable beam. Yet in another alternative, when no suitable beam is found, the UE may select the best beam among the detected beams associated with dedicated RACH resources if available, or the best beam among the detected beams associated with the common RACH resources if available, or simply the best beam among all detected beams.

Separately, the beam and PRACH resource selection function determines which PRACH resource to select from the set of PRACH resources associated with the suitable beams. The selection criterion is used to control how the beam and PRACH resource are selected. The selection criterion may be specified and/or configured by the network via broadcast and/or dedicated signaling. When selecting the PRACH resource, one or more of the following may be considered: (i) the measurement quantity of the beam associated with the PRACH resource, e.g., RSRP, RSRQ, SINR or CQI; (ii) the type of RS associated with the beam; e.g., SS or CSI-RS; (iii) the type of PRACH resource; e.g., dedicated or common; and (iv) the Time/Frequency (T/F) resource used by the PRACH resource. Note: The NR-UNIT containing a PRACH resource may be a subframe, TTI, slot, mini-slot, symbol or any other time unit defined for NR.

Figure 9:
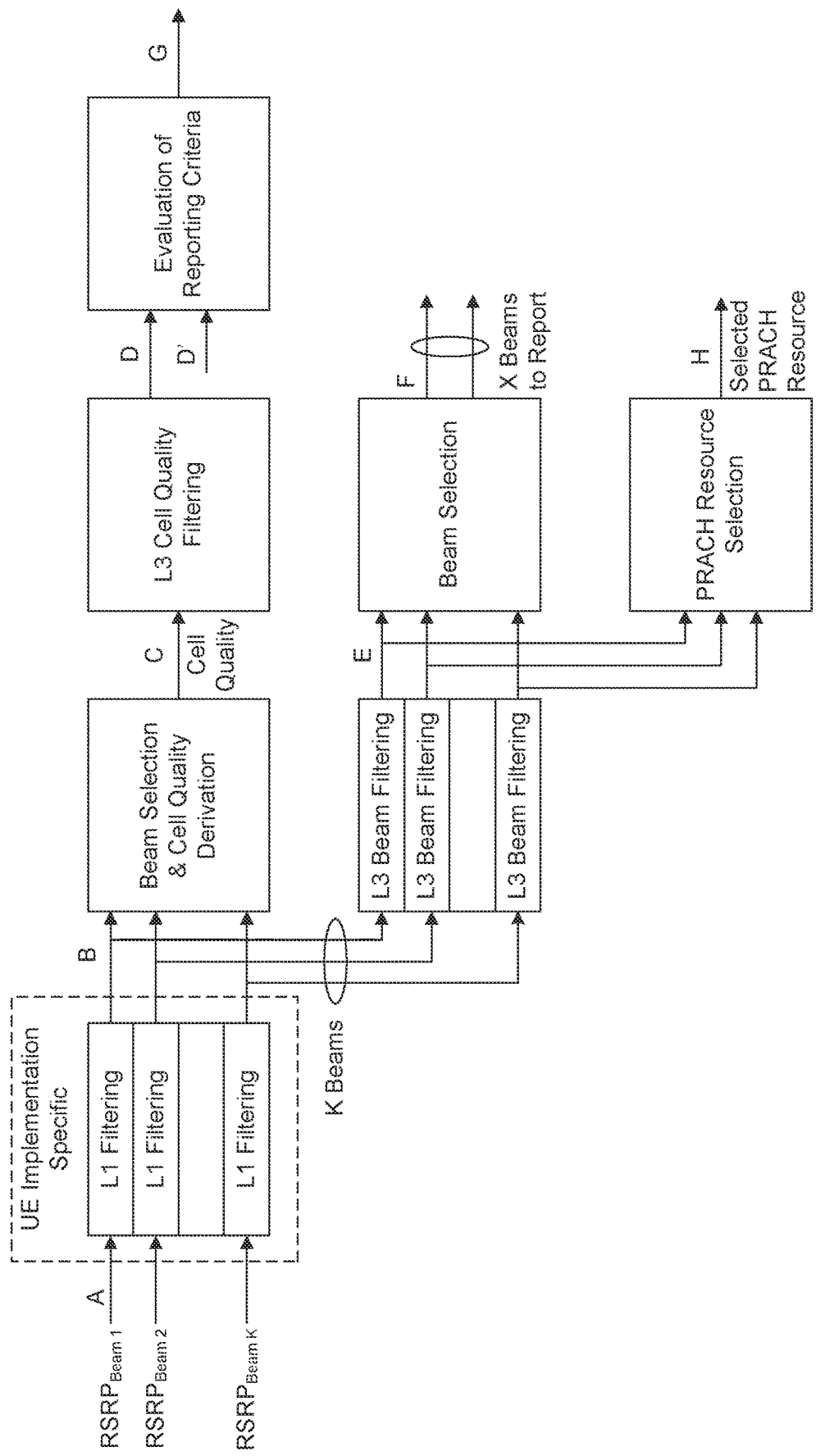
FIG. 9 illustrates a PRACH resource selection model integration with a RRM measurement model according to an embodiment.
Figure 10A:
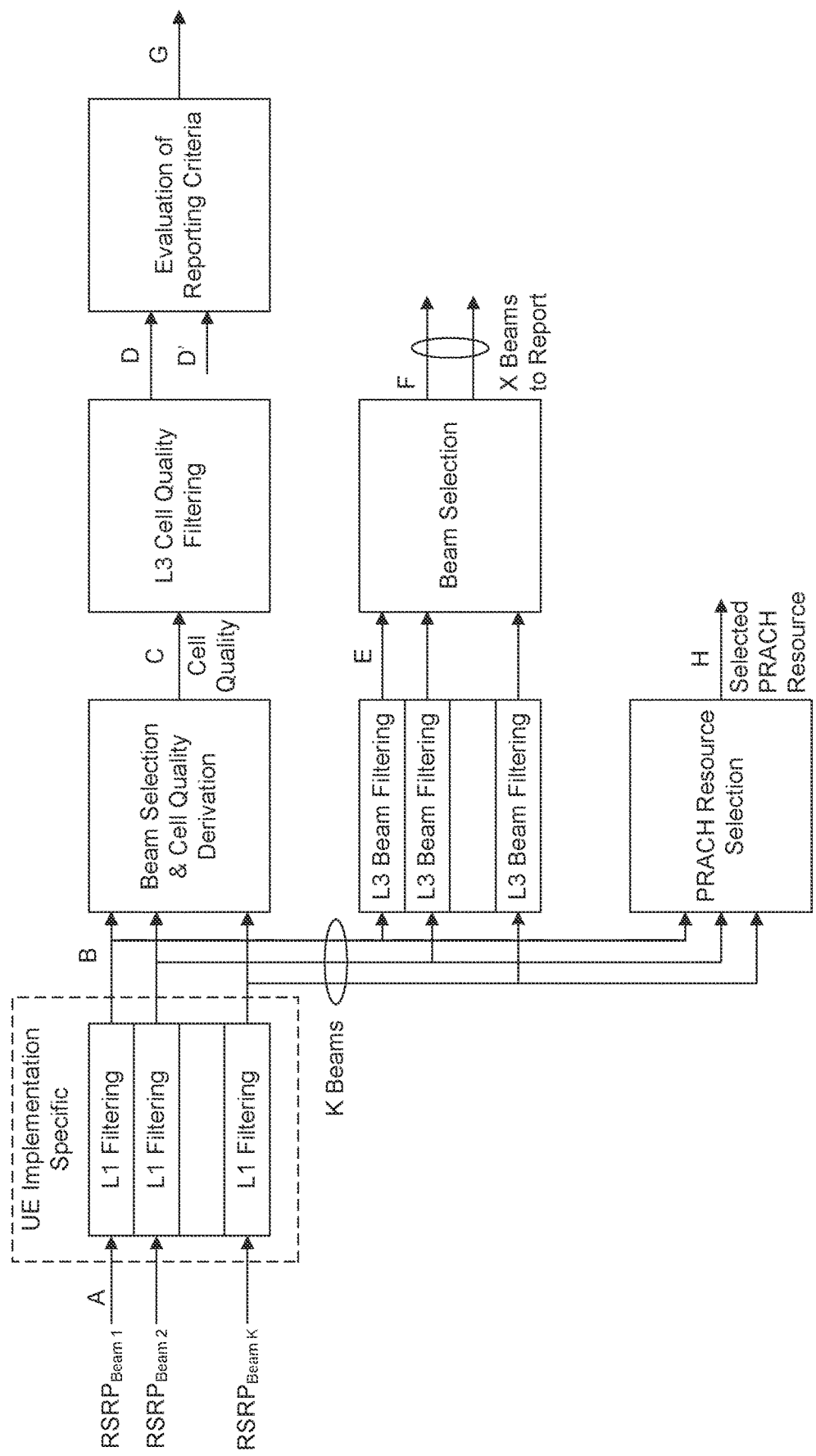
FIG. 10A illustrates a PRACH resource selection model integration with a RRM measurement model according to another embodiment.
Figure 10B:
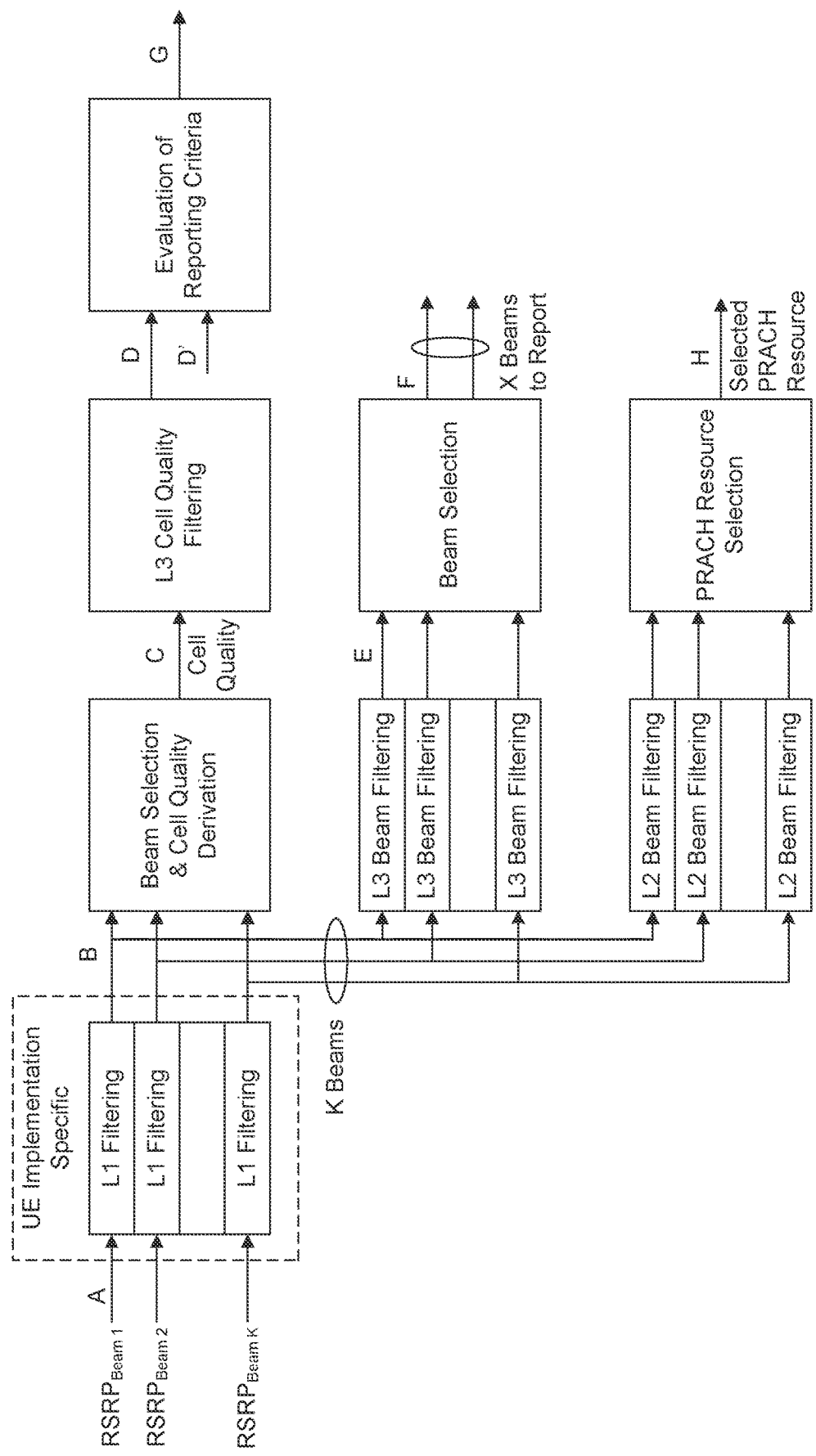
FIG. 10B illustrates a PRACH resource selection model integration with a RRM measurement model according to yet another embodiment.

The PRACH resource selection model may be integrated with the RRM measurement model as shown in the figures below. FIG. 9 is an embodiment where the inputs to the PRACH resource selection model correspond to the beam measurements after the L3 beam filtering. FIG. 10A is an alternate embodiment where the inputs to the PRACH resource selection model correspond to the beam measurements before the L3 beam filtering. FIG. 10B is yet another embodiment where the inputs to the PRACH resource selection model correspond to the beam measurements after L2 beam filtering, where the L2 filter may be UE implementation specific or configured by the network; e.g. via RRC signaling.

In the following sections, we propose alternate solutions for performing PRACH resource selection based on the model proposed above. By making some or all configuration parameters/selection criterion configurable via the network, the proposed PRACH resource selection functionality can be optimized for the various deployment scenarios and use cases being considered for NR.

Unless otherwise indicated in the descriptions of the procedures below, if the gNB includes dedicated RACH resources in the handover command, the UE shall attempt to use the dedicated RACH resources first if corresponding beam(s) are suitable. If the gNB includes in the handover command, downlink beam information (SS based beam or CSI-RS based beam) but no corresponding dedicated RACH resources for any of the downlink beam, the UE should perform random access procedure by selecting a RACH resource from the configured common RACH resources.

In the descriptions of the procedures below, the following terms may be used interchangeably: (i) "dedicated PRACH resource(s)" and "contention free RA resource(s)"; (ii) "common PRACH resource(s)" and "contention based RA resource(s)"; and (iii) "PRACH opportunity" and "PRACH occasion."

Figure 11:
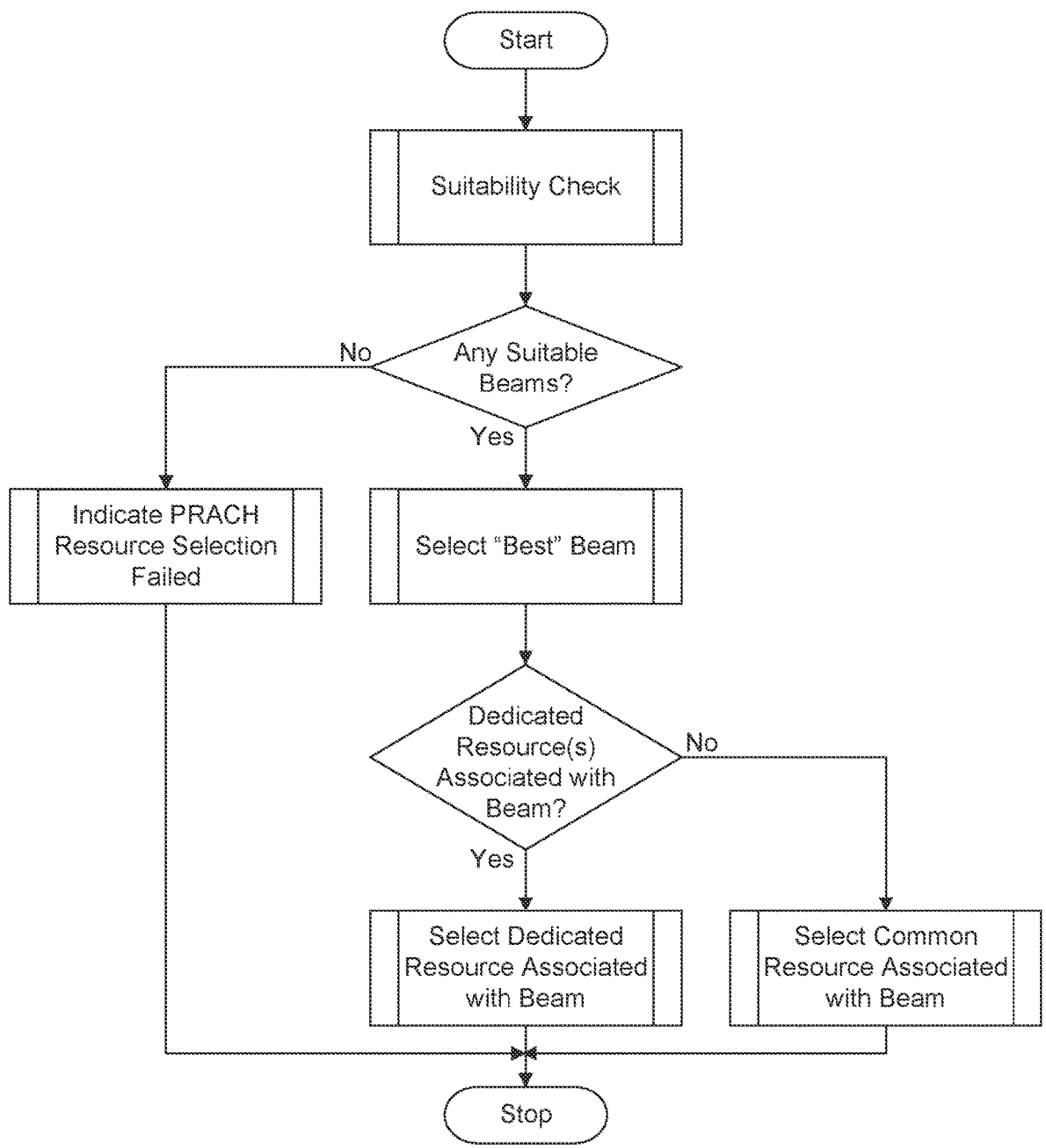
FIG. 11 illustrates a PRACH resource selection procedure according to an embodiment.

According to an alternative embodiment, it is envisaged to select the PRACH resource used for access to the target cell from the set of PRACH resources associated with the "best" beam. If the "best" beam is associated with dedicated and common PRACH resources, the PRACH resource is selected from the set of dedicated PRACH resources. The NR-UNIT containing the next available PRACH opportunity may be a subframe, TTI, slot, mini-slot, symbol or any other time unit defined for NR. A flow chart illustrating the steps of the proposed PRACH resource selection procedure is shown in FIG. 11. The following steps as disclosed below are denoted by Arabic numerals.

1. The UE determines which of the detected beams of the target cell are suitable for performing random access using the methods discussed above. A single threshold may be used to determine the suitability of the detected beams. The threshold may be set to a value that corresponds to the minimum quality that is required to use a beam for random access. Multiple threshold may be used, where a given threshold is dependent on the type of reference signal associated with the beam. For example, a first threshold; e.g. SSB-threshold, may be used for beams associated with SS blocks and a second threshold; e.g. CSI-RS threshold, may be used for beams associated with CSI-RS configurations. If none of the beams satisfy the threshold(s), the UE may consider any beam that allows the UE to meet the target received power of the RACH preamble with its maximum transmit power as a suitable beam. Alternatively, when no suitable beam is found, the UE may select the best beam among the detected beams associated with dedicated RACH resources if available, or the best beam among the detected beams associated with the common RACH resources if available, or simply the best beam among all detected beams. If a minimum quality is not required, the threshold may be set to an arbitrarily low value such that all detected beams will pass the suitability check.

2. If there are not any suitable beams, the PRACH resource selection is considered not successful and the procedure ends. An indication of the failure may be sent to higher layers. Alternatively, when no suitable beam is found, the UE may select the best beam among the detected beams associated with dedicated RACH resources if available, or the best beam among the detected beams associated with the common RACH resources if available, or simply the best beam among all detected beams. Yet in another alternatively, the UE may continue to perform measurements and repeat the suitability check multiple times before the PRACH resource selection is considered not successful. The repetition of the procedure may be controlled using a counter, thereby allowing the procedure to be repeated up to N times. In another embodiment, the repetition of the procedure may be controlled using a timer, where the procedure may be repeated until the timer expires. And in yet another embodiment, the repetition of the procedure may be controlled by a counter and a timer, thereby allowing the procedure to be repeated up to N times before the timer expires.

3. The "best" beam; e.g., the one with the greatest RSRP, is selected from the set of suitable beams.

4. The UE determines if there are dedicated PRACH resources associated with the selected beam. The UE may be informed of the association between beams and dedicated PRACH resources using dedicated signaling, e.g., using, the NR-RACH-ConfigDedicated IE signaled via the handover command.

5. If the selected beam is associated with dedicated PRACH resources, the UE selects a PRACH resource from the set of dedicated PRACH resources associated with the selected beam, the PRACH resource selection is considered successful and the procedure ends. Otherwise, the procedure continues with the next step. If the set of dedicated PRACH resources associated with the beam includes more than one dedicated PRACH resource, the UE may select the PRACH resource at random. Alternatively, the UE may take the T/F configuration of the dedicated PRACH resources into consideration when making the selection. For example, if the beam is associated with multiple PRACH resources that occur at different times, then it may be advantageous for the UE to select the PRACH resource whose PRACH opportunity occurs next.

6. The UE selects a common PRACH resource from the set of common PRACH resources associated with the beam, the PRACH resource selection is considered successful and the procedure ends. If the set of common PRACH resources associated with the beam includes more than one common PRACH resource, the UE may select the beam as described for the case when the PRACH resource is selected from a set that includes more than one dedicated PRACH resource; e.g. at random, based on the T/F configuration of the common PRACH resources.

Figure 12:
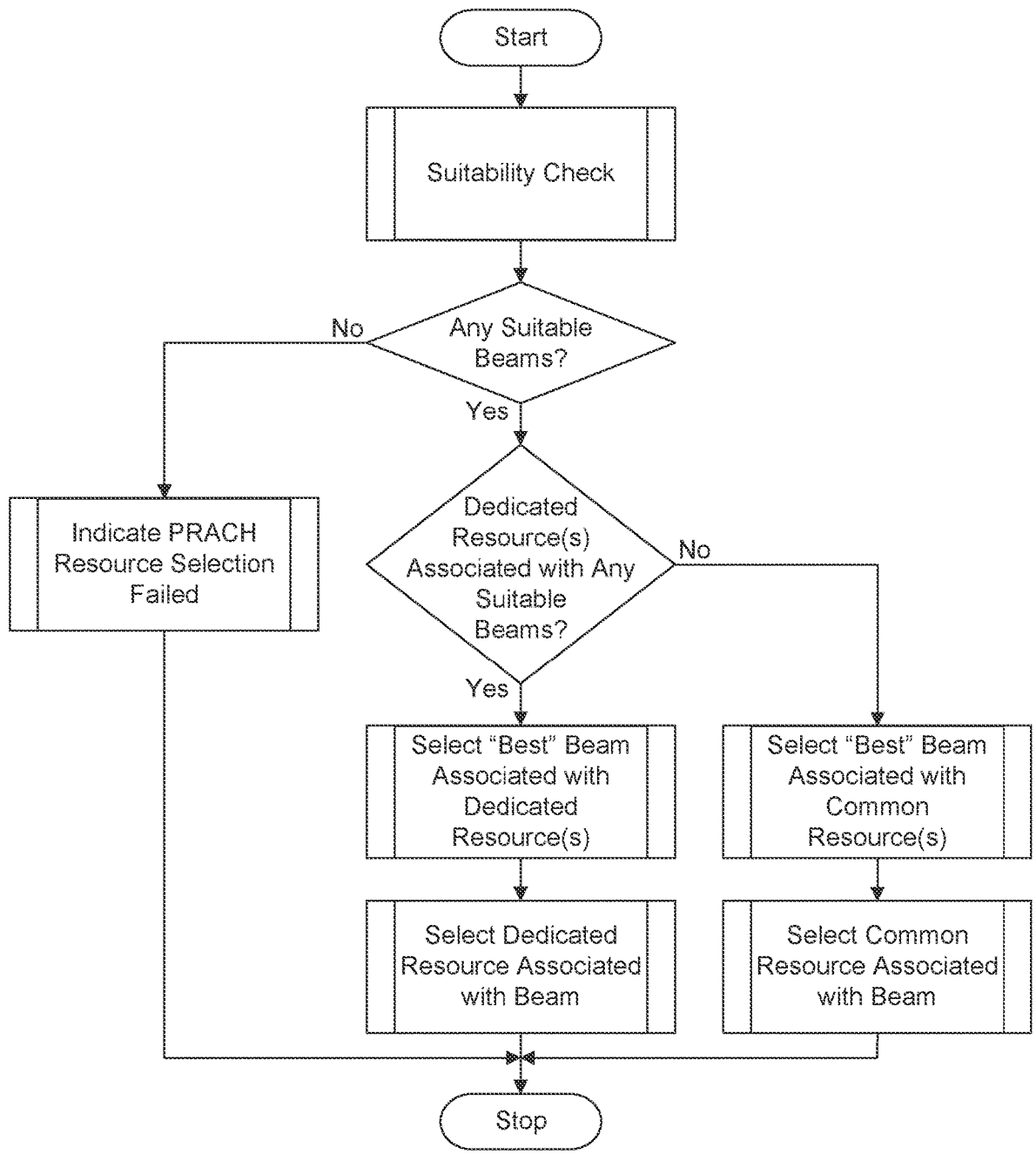
FIG. 12 illustrates a PRACH resource selection procedure according to another embodiment.

According to an alternative embodiment, a technique is envisaged to select the PRACH resource used for access to the target cell from the set of PRACH resources associated with the "best" beam, where the "best" beam is first attempted to be selected from the set of suitable beams associated with dedicated PRACH resources; and if no such beams exist, the "best" beam is selected from the set of suitable beams associated with common PRACH resources. The NR-UNIT containing the next available PRACH opportunity may be a subframe, TTI, slot, mini-slot, symbol or any other time unit defined for NR. A flow chart illustrating the steps, as denoted by Arabic numerals, of the proposed PRACH resource selection procedure is shown in FIG. 12.

1. The UE determines which of the detected beams of the target cell are suitable for performing random access using methods described above. A single threshold may be used to determine the suitability of the detected beams. The threshold may be set to a value that corresponds to the minimum quality that is required to use a beam for random access. Multiple thresholds may be used, where a given threshold is dependent on the type of reference signal associated with the beam. For example, a $1^{st}$ threshold; e.g., SSB-threshold, may be used for beams associated with SS blocks and a $2^{nd}$ threshold; e.g. CSI-RS threshold, may be used for beams associated with CSI-RS configurations. If none of the beams satisfy the threshold(s), the UE may consider any beam that allows the UE to meet the target received power of the RACH preamble with its maximum transmit power as a suitable beam. Alternatively, when no suitable beam is found, the UE may select the best beam among the detected beams associated with dedicated RACH resources if available, or the best beam among the detected beams associated with the common RACH resources if available, or simply the best beam among all detected beams. If a minimum quality is not required, the threshold may be set to an arbitrarily low value such that all detected beams will pass the suitability check.

2. If there aren't any suitable beams, the PRACH resource selection is considered not successful and the procedure ends. An indication of the failure may be sent to higher layers. Alternatively, when no suitable beam is found, the UE may select the best beam among the detected beams associated with dedicated RACH resources if available, or the best beam among the detected beams associated with the common RACH resources if available, or simply the best beam among all detected beams. Yet in another alternative, the UE may continue to perform measurements and repeat the suitability check multiple times before the PRACH resource selection is considered not successful. The repetition of the procedure may be controlled using a counter, thereby allowing the procedure to be repeated up to N times. In another embodiment, the repetition of the procedure may be controlled using a timer, where the procedure may be repeated until the timer expires. And in yet another embodiment, the repetition of the procedure may be controlled by a counter and a timer, thereby allowing the procedure to be repeated up to N times before the timer expires.

3. The UE determines if there are dedicated PRACH resources associated with the set of suitable beams. The UE may be informed of the association between beams and dedicated PRACH resources using dedicated signaling, e.g., using the NR-RACH-ConfigDedicated IE signaled via the handover command.

4. If there are suitable beams associated with dedicated PRACH resources, the "best" beam, e.g., the one with the greatest RSRP, is selected from the set of suitable beams associated with dedicated PRACH resources and the procedure continues with the next step. Otherwise, the next step is skipped.

5. The UE selects a PRACH resource from the set of dedicated PRACH resources associated with the selected beam, the PRACH resource selection is considered successful and the procedure ends. If the set of dedicated PRACH resources associated with the beam includes more than one dedicated PRACH resource, the UE may select the PRACH resource at random. Alternatively, the UE may take the T/F configuration of the dedicated PRACH resources into consideration when making the selection. For example, if the beam is associated with multiple PRACH resources that occur at different times, then it may be advantageous for the UE to select the PRACH resource whose PRACH opportunity occurs next.

6. The UE selects a common PRACH resource from the set of common PRACH resources associated with the selected beam, the PRACH resource selection is considered successful and the procedure ends. If the set of common PRACH resources associated with the beam includes more than one common PRACH resource, the UE may select the beam as described for the case when the PRACH resource is selected from a set that includes more than one dedicated PRACH resource; e.g. at random, based on the T/F configuration of the common PRACH resources.

Figure 13:
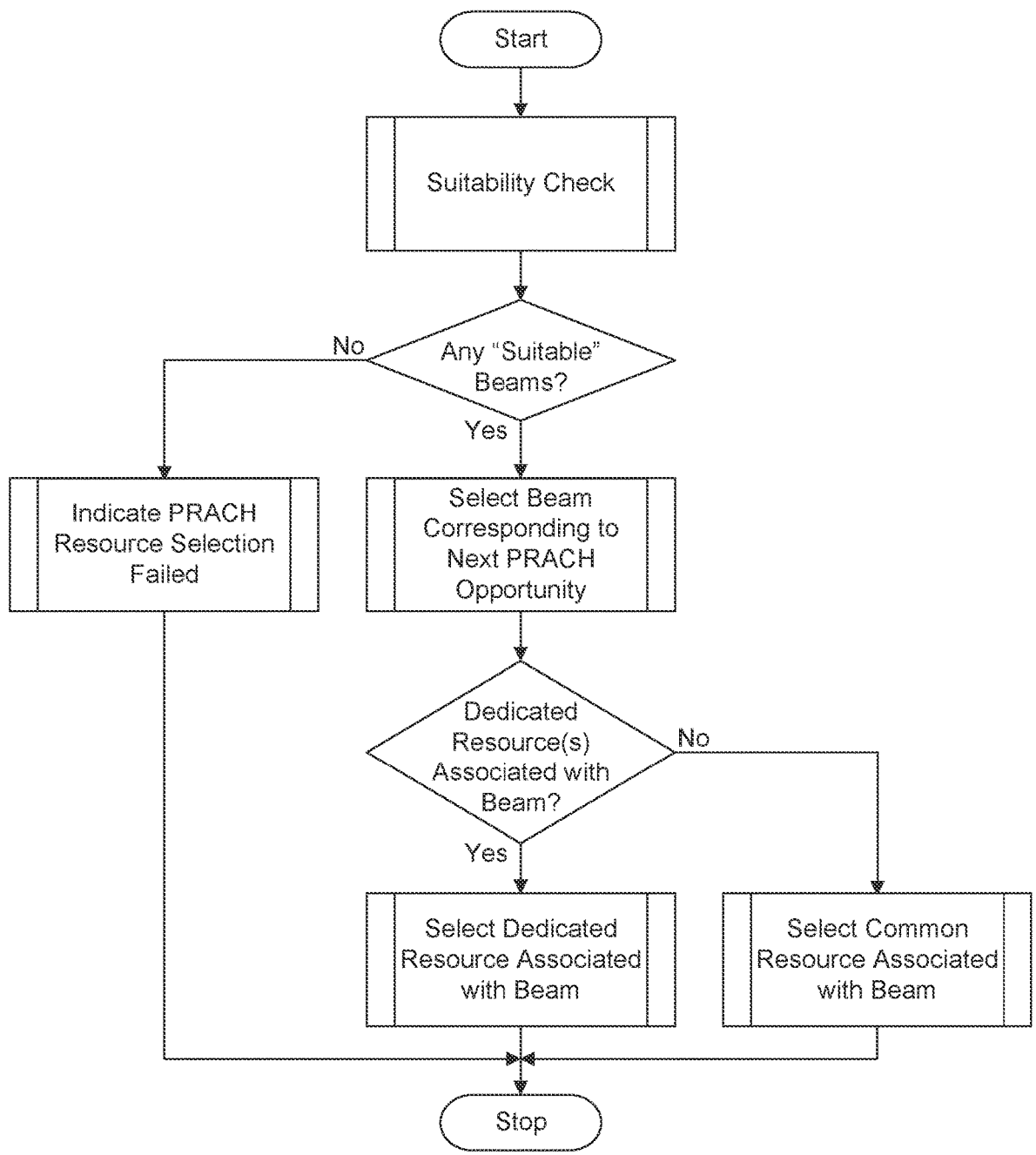
FIG. 13 illustrates a PRACH resource selection procedure according to yet another embodiment.

According to yet even a further alternative embodiment, it is envisaged to select the PRACH resource used for access to the target cell from the set of PRACH resources associated with the suitable beam whose PRACH opportunity occurs next. If the beam is associated with dedicated and common PRACH resources, the PRACH resource is selected from the set of dedicated PRACH resources. The NR-UNIT containing the next available PRACH opportunity may be a subframe, TTI, slot, mini-slot, symbol or any other time unit defined for NR. A flow chart illustrating the steps, as denoted by Arabic numerals, of the proposed PRACH resource selection procedure is shown in FIG. 13.

1. The UE determines which of the detected beams of the target cell are suitable for performing random access using the methods described above. For example, a single threshold may be used to determine the suitability of the detected beams. The threshold may be set to a value that corresponds to the minimum quality that is required to use a beam for random access. Multiple thresholds may be used, where a given threshold is dependent on the type of reference signal associated with the beam. For example, a $1^{st}$ threshold; e.g. SSB-threshold, may be used for beams associated with SS blocks and a $2^{nd}$ threshold; e.g. CSI-RS threshold, may be used for beams associated with CSI-RS configurations. If none of the beams satisfy the threshold(s), the UE may consider any beam that allows the UE to meet the target received power of the RACH preamble with its maximum transmit power as a suitable beam. Alternatively, when no suitable beam is found, the UE may select the best beam among the detected beams associated with dedicated RACH resources if available, or the best beam among the detected beams associated with the common RACH resources if available, or simply the best beam among all detected beams. If a minimum quality is not required, the threshold may be set to an arbitrarily low value such that all detected beams will pass the suitability check.

2. If there aren't any suitable beams, the PRACH resource selection is considered not successful and the procedure ends. An indication of the failure may be sent to higher layers. Alternatively, when no suitable beam is found, the UE may select the best beam among the detected beams associated with dedicated RACH resources if available, or the best beam among the detected beams associated with the common RACH resources if available, or simply the best beam among all detected beams. Yet in another alternatively, the UE may continue to perform measurements and repeat the suitability check multiple times before the PRACH resource selection is considered not successful. The repetition of the procedure may be controlled using a counter, thereby allowing the procedure to be repeated up to N times. In another embodiment, the repetition of the procedure may be controlled using a timer, where the procedure may be repeated until the timer expires. And in yet another embodiment, the repetition of the procedure may be controlled by a counter and a timer, thereby allowing the procedure to be repeated up to N times before the timer expires.

3. The UE selects the beam associated with PRACH resources that correspond to the next PRACH opportunity. In one embodiment, if there are multiple suitable beams associated with the next PRACH opportunity, the UE may select the beam using any method that results in the selection of one of the suitable beams associated with the next PRACH opportunity. For example, the UE may select the beam associated with dedicated PRACH resources, the UE may select the "best" beam; e.g. the beam with greatest RSRP or the UE may randomly select, with equal probability, one beam from the set suitable beams associated with the next PRACH opportunity.

4. The UE determines if there are dedicated PRACH resources associated with the selected beam. The UE may be informed of the association between beams and dedicated PRACH resources using dedicated signaling, e.g., using, the NR-RACH-ConfigDedicated IE signaled via the handover command.

5. If the selected beam is associated with dedicated PRACH resources, the UE selects a PRACH resource from the set of dedicated PRACH resources associated with the selected beam, the PRACH resource selection is considered successful and the procedure ends. Otherwise, the procedure continues with the next step. If the set of dedicated PRACH resources associated with the beam includes more than one dedicated PRACH resource, the UE selects the PRACH resource whose PRACH opportunity occurs next.

Figure 14:
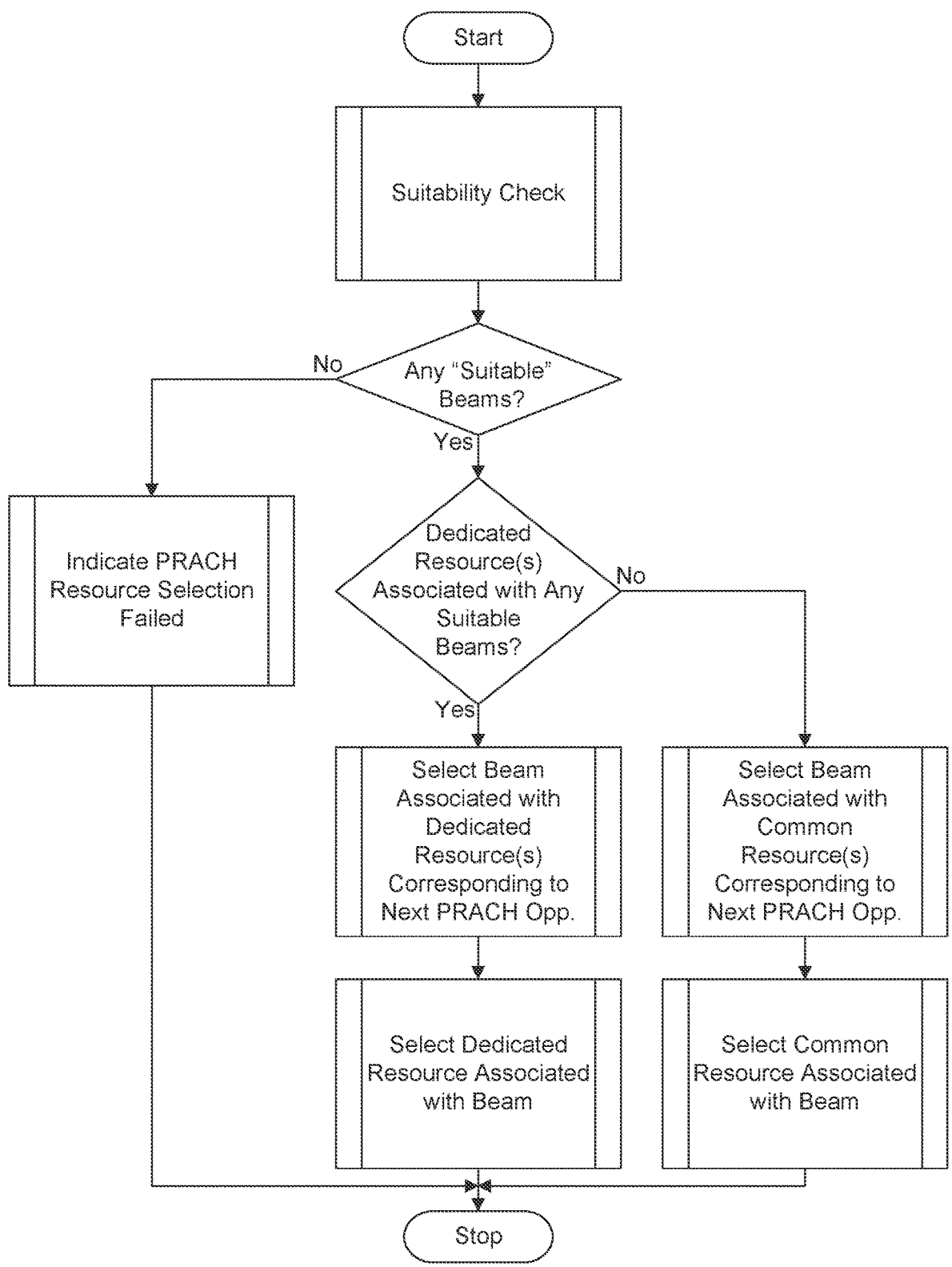
FIG. 14 illustrates a PRACH resource selection procedure according to yet even another embodiment.

6. The UE selects a common PRACH resource from the set of common PRACH resources associated with the beam, the PRACH resource selection is considered successful and the procedure ends. If the set of common PRACH resources associated with the beam includes more than one common PRACH resource, the UE selects the PRACH resource whose PRACH opportunity occurs next. If multiple common PRACH resources are configured for the next PRACH opportunity associated with the beam, the UE may randomly select, with equal probability, one PRACH from the set of common PRACH resources configured for the next PRACH opportunity According to even a further alternative embodiment, it is envisaged to select the PRACH resource used for access to the target cell from the set of PRACH resources associated with the suitable beam whose PRACH opportunity occurs next, where the beam is first attempted to be selected from the set of suitable beams associated with dedicated PRACH resources; and if no such beams exist, the beam is selected from the set of suitable beams associated with common PRACH resources. The NR-UNIT containing the next available PRACH opportunity may be a subframe, TTI, slot, mini-slot, symbol or any other time unit defined for NR. A flow chart illustrating the steps, as denoted by Arabic numerals, of the proposed PRACH resource selection procedure is shown in FIG. 14.

1. The UE determines which of the detected beams of the target cell are suitable for performing random access using the methods described above. For example, a single threshold may be used to determine the suitability of the detected beams. The threshold may be set to a value that corresponds to the minimum quality that is required to use a beam for random access. Multiple thresholds may be used, where a given threshold is dependent on the type of reference signal associated with the beam. For example, a $1^{st}$ threshold; e.g. SSB-threshold, may be used for beams associated with SS blocks and a $2^{nd}$ threshold; e.g. CSI-RS threshold, may be used for beams associated with CSI-RS configurations. If none of the beams satisfy the threshold(s), the UE may consider any beam that allows the UE to meet the target received power of the RACH preamble with its maximum transmit power as a suitable beam. Alternatively, when no suitable beam is found, the UE may select the best beam among the detected beams associated with dedicated RACH resources if available, or the best beam among the detected beams associated with the common RACH resources if available, or simply the best beam among all detected beams. If a minimum quality is not required, the threshold(s) may be set to an arbitrarily low value such that all detected beams will pass the suitability check.

2. If there aren't any suitable beams, the PRACH resource selection is considered not successful and the procedure ends. An indication of the failure may be sent to higher layers. Alternatively, when no suitable beam is found, the UE may select the best beam among the detected beams associated with dedicated RACH resources if available, or the best beam among the detected beams associated with the common RACH resources if available, or simply the best beam among all detected beams. Yet in another alternatively, the UE may continue to perform measurements and repeat the suitability check multiple times before the PRACH resource selection is considered not successful. The repetition of the procedure may be controlled using a counter, thereby allowing the procedure to be repeated up to N times. In another embodiment, the repetition of the procedure may be controlled using a timer, where the procedure may be repeated until the timer expires. And in yet another embodiment, the repetition of the procedure may be controlled by a counter and a timer, thereby allowing the procedure to be repeated up to N times before the timer expires 3. The UE determines if there are dedicated PRACH resources using dedicated signaling, e.g., using associated with the set of suitable beams. The UE may be informed of the association between beams and dedicated PRACH resources using the NR-RACH-ConfigDedicated IE signaled via the handover command.

4. If there are suitable beams associated with dedicated PRACH resources, the beam associated with PRACH resources that correspond to the next PRACH opportunity is selected from the set of suitable beams associated with dedicated PRACH resources and the procedure continues with the next step. If there are not any dedicated PRACH resources associated with the set of suitable beams, the next step is skipped.

In an embodiment, if there are multiple suitable beams associated with the next PRACH opportunity, the UE may select the beam using any method that results in the selection of one of the suitable beams associated with the next PRACH opportunity. For example, the UE may select the "best" beam; e.g., the beam with greatest RSRP, or the UE may randomly select, with equal probability, one beam from the set suitable beams associated with the next PRACH opportunity.

5. The UE selects a PRACH resource from the set of dedicated PRACH resources associated with the selected beam, the PRACH resource selection is considered successful and the procedure ends. If the set of dedicated PRACH resources associated with the beam includes more than one dedicated PRACH resource, the UE selects the PRACH resource whose PRACH opportunity occurs next.

6. The beam associated with PRACH resources that correspond to the next PRACH opportunity is selected from the set of suitable beams associated with common PRACH resources. In one embodiment, if there are multiple suitable beams associated with the next PRACH opportunity, the UE may select the beam using any method that results in the selection of one of the suitable beams associated with the next PRACH opportunity. For example, the UE may select the "best" beam; e.g., the beam with greatest RSRP, or the UE may randomly select, with equal probability, one beam from the set suitable beams associated with the next PRACH opportunity.

7. The UE selects a common PRACH resource from the set of common PRACH resources associated with the beam, the PRACH resource selection is considered successful and the procedure ends. If the set of common PRACH resources associated with the beam includes more than one common PRACH resource, the UE selects the PRACH resource whose PRACH opportunity occurs next. If multiple common PRACH resources are configured for the next PRACH opportunity associated with the beam, the UE may randomly select, with equal probability, one PRACH from the set of common PRACH resources configured for the next PRACH opportunity.

Figure 15:
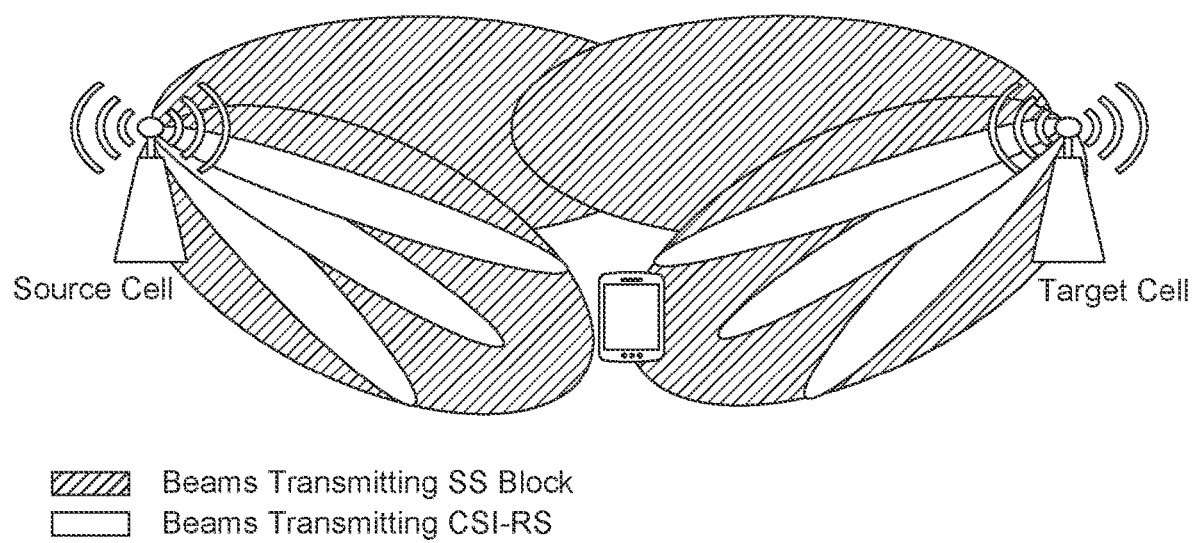
FIG. 15 illustrates an exemplary NR deployment scenario according to another embodiment.

According to yet even a further embodiment, as exemplary illustrated in FIG. 15, an NR deployment describes where SS block transmissions (SSBs) are associated with wide beams and CSI-RS transmissions are associated with narrow beams. The narrow beams may be used for high data rate services. For such a deployment, when performing handover to a target cell, it would be advantageous to handover to a narrow beam to minimize the interruption time to the high data rate services. However, since handover to a narrow beam may be less reliable than handover to a wide beam, we propose that the handover command includes a first set of PRACH resources associated with the narrow beam(s) that may be used for a first access attempt and second set of PRACH resources associated with the wide beam(s) that may be used for a second access attempt in the event the first access attempt is not successful. In one embodiment, the first set of PRACH resources are dedicated PRACH resources associated with CSI-RS configurations; i.e. the narrow beams, and the second set of PRACH resources are common PRACH resources associated with SSBs; i.e. the wide beams. Alternatively, both the first and second set of PRACH resources may be dedicated PRACH resources; i.e. the first set of PRACH resources may be dedicated PRACH resources associated with CSI-RS configurations and the second set of PRACH resources may be dedicated PRACH resources associated with SSBs.

It is noted that for NR, the parameters for the common RACH configuration for the target cell may be optionally signaled in the handover command. Therefore, for scenarios where the second set of PRACH resources are common PRACH resources, the second set of PRACH resources may not be included in the handover command, but may instead be determined using an alternate SI acquisition method as described above.

The number of access attempt(s) using the first set of PRACH resources may be controlled using a counter, thereby allowing the UE to perform up to N access attempts using the first set of PRACH resources before attempting to access the cell using the second set of PRACH resources. In another embodiment, the number of access attempts using the first set of PRACH resources may be controlled using a timer, thereby allowing the UE to perform multiple access attempts using the first set of PRACH resources until the timer expires. And in yet another embodiment, the access attempts using the first set of PRACH resources may be controlled using a counter and a timer, thereby allowing the UE to perform up to N access attempts using the first set of PRACH resources before the timer expires.

The deployment shown in FIG. 15 is used to illustrate how the proposed solutions may be used when the SSBs are associated with wide beams and the CSI-RS configurations are associated with narrow beams. However, the proposed solutions may be used for any scenario that requires "fallback" to a second set of PRACH resources in the event the access attempt(s) using the first set of PRACH resources is not successful. For example, the proposed solutions may also be used when the first set of PRACH resources are dedicated PRACH resources associated with SSBs and the second set of PRACH resources are common PRACH resources that are also associated with SSBs.

Figure 16A:
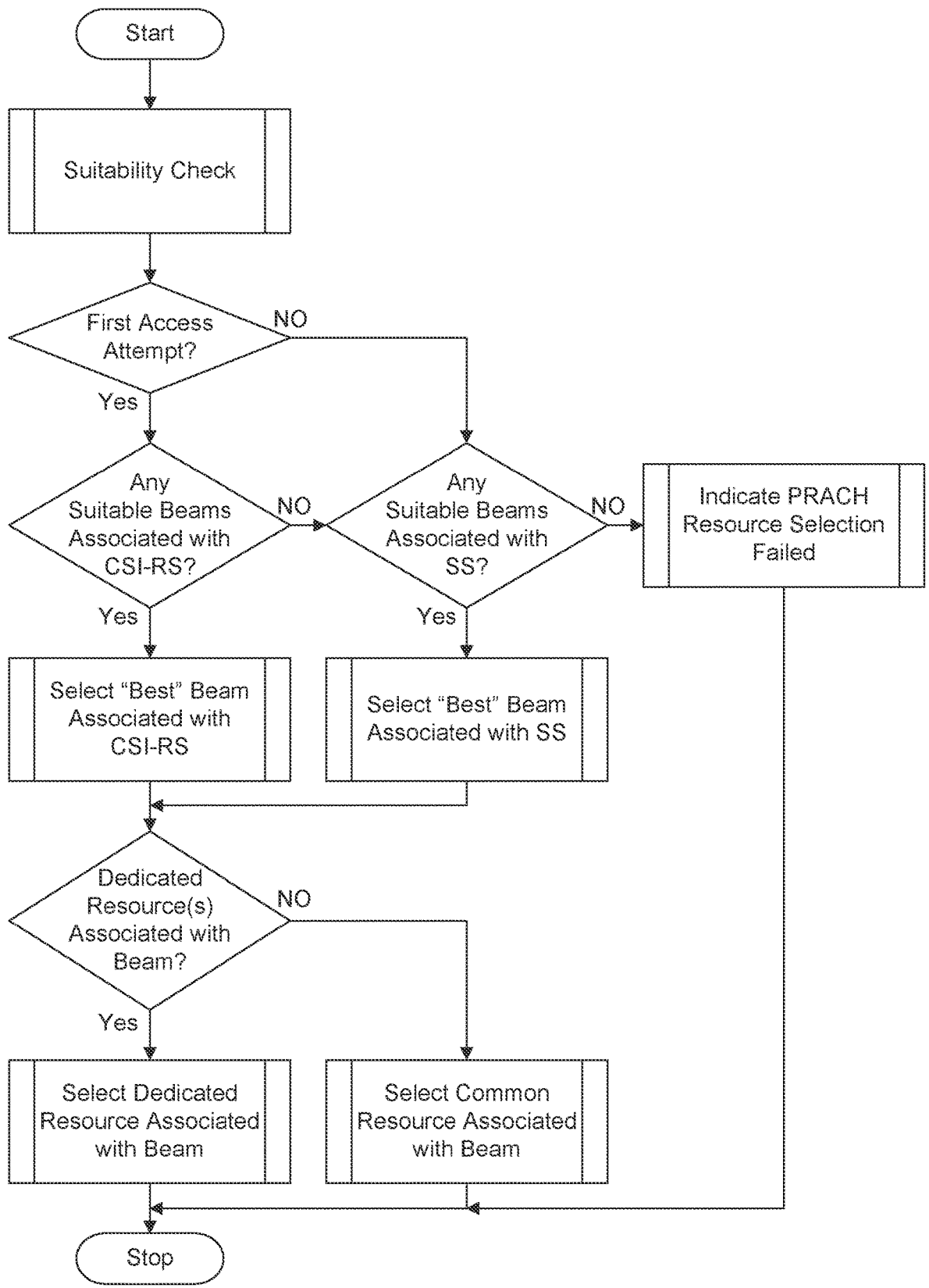
FIG. 16A illustrates a PRACH resource selection procedure according to a further embodiment.

A flow chart illustrating the steps, as denoted by Arabic numerals, of the proposed PRACH resource selection procedure is shown in FIG. 16A.

1. The UE determines which of the detected beams of the target cell are suitable for performing random access according to methods described above. For example, a single threshold may be used to determine the suitability of the detected beams. The threshold may be set to a value that corresponds to the minimum quality that is required to use a beam for random access. Multiple thresholds may be used, where a given threshold is dependent on the type of reference signal associated with the beam. For example, a first threshold, e.g., SSB-threshold, may be used for beams associated with SS blocks and a second threshold, e.g., CSI-RS threshold, may be used for beams associated with CSI-RS configurations. If none of the beams satisfy the threshold(s), the UE may consider any beam that allows the UE to meet the target received power of the RACH preamble with its maximum transmit power as a suitable beam. Alternatively, when no suitable beam is found, the UE may select the best beam among the detected beams associated with dedicated RACH resources if available, or the best beam among the detected beams associated with the common RACH resources if available, or simply the best beam among all detected beams. If a minimum quality is not required, the threshold may be set to an arbitrarily low value such that all detected beams will pass the suitability check.

2. If this is the first access attempt, the procedure continues with the next step. Otherwise the procedure continues with step 8.

3. If there are suitable beams associated with the first set of PRAH resources, e.g., CSI-RS configurations, the procedure continues with the next step. Otherwise, the procedure continues with the step 8.

4. The "best" beam; i.e., the one with the greatest RSRP, is selected from the set of suitable beams associated with the first set of PRACH resources; e.g., the set of suitable beams associated with CSI-RS configurations. Alternatively, the beam associated with PRACH resources that correspond to the next PRACH opportunity may be selected from the set of suitable beams associated with the first set of PRACH resources.

5. The UE determines if there are dedicated PRACH resources associated with the selected beam. The UE may be informed of the association between beams and dedicated PRACH resources using dedicated signaling, e.g., using the NR-RACH-ConfigDedicated IE signaled via the handover command.

6. If the selected beam is associated with dedicated PRACH resources, the UE selects a PRACH resource from the set of dedicated PRACH resources associated with the selected beam, the PRACH resource selection is considered successful and the procedure ends. Otherwise, the procedure continues with the next step. If the set of dedicated PRACH resources associated with the beam includes more than one dedicated PRACH resource, the UE may select the PRACH resource at random. Alternatively, the UE may take the T/F configuration of the dedicated PRACH resources into consideration when making the selection. For example, if the beam is associated with multiple PRACH resources that occur at different times, then it may be advantageous for the UE to select the PRACH resource whose PRACH opportunity occurs next.

7. The UE selects a common PRACH resource from the set of common PRACH resources associated with the beam, the PRACH resource selection is considered successful and the procedure ends. If the set of common PRACH resources associated with the beam includes more than one common PRACH resource, the UE may select the beam as described for the case when the PRACH resource is selected from a set that includes more than one dedicated PRACH resource; e.g. at random, based on the T/F configuration of the common PRACH resources.

8. If there are not any suitable beams associated with the second set of PRACH resources, e.g., SS blocks (SSBs), the PRACH resource selection is considered not successful and the procedure ends. An indication of the failure may be sent to higher layers. Otherwise, the procedure continues with the next step.

9. The "best" beam; i.e., the one with the greatest RSRP, is selected from the set of suitable beams associated with the second set of PRACH resources; e.g., the set of suitable beams associated with SS blocks. Alternatively, the beam associated with PRACH resources that correspond to the next PRACH opportunity may be selected from the set of suitable beams associated with the second set of PRACH resources.

10. The UE determines if there are dedicated PRACH resources associated with the selected beam. The UE may be informed of the association between beams and dedicated PRACH resources using the NR-RACH-ConfigDedicated IE signaled via the handover command.

11. If the selected beam is associated with dedicated PRACH resources, the UE selects a PRACH resource from the set of dedicated PRACH resources associated with the selected beam, the PRACH resource selection is considered successful and the procedure ends. Otherwise, the procedure continues with the next step. If the set of dedicated PRACH resources associated with the beam includes more than one dedicated PRACH resource, the UE may select the PRACH resource at random. Alternatively, the UE may take the T/F configuration of the dedicated PRACH resources into consideration when making the selection. For example, if the beam is associated with multiple PRACH resources that occur at different times, then it may be advantageous for the UE to select the PRACH resource whose PRACH opportunity occurs next.

12. The UE selects a common PRACH resource from the set of common PRACH resources associated with the beam, the PRACH resource selection is considered successful and the procedure ends. If the set of common PRACH resources associated with the beam includes more than one common PRACH resource, the UE may select the beam as described for the case when the PRACH resource is selected from a set that includes more than one dedicated PRACH resource; e.g. at random, based on the T/F configuration of the common PRACH resources.

According to yet even a further embodiment, it is assumed the beam used for initial access on the downlink is SS based beam. The gNB may include in the handover command, an SS based beam and/or the corresponding SS block. For each beam or SS block included in the handover command for initial access, the gNB assigns only one dedicated RACH resource. The gNB may include more than one beam and/or SS block in the handover command. The UE may select the beam/SS Block and the corresponding RACH resource to use for initial access using one of the beam selection procedures described above.

In another embodiment, the gNB may include in the handover command, an indication to use more than one RACH resources for parallel initial attempts for e.g., using this indication, the UE may transmit one or more additional RACH preambles before the RAR of the first transmitted preamble. Furthermore, the gNB may also include in the handover command, how many parallel attempts, the UE may be allowed to perform. For each beam or SS block included in the handover command for initial access, the gNB may assign more than one dedicated RACH resource. The UE may determine RACH resources for parallel initial attempts, by selecting the up to the number of corresponding beams/SS blocks using one of the beam selection procedures described above. In an alternative embodiment, the UE may selects the beams for initial attempt as the highest ranked beams where the beams are ranked in decreasing order of the number of the corresponding CSI-RS beams with quality above a configured threshold.

In this embodiment, it is assumed the beam used for initial access on the downlink is CSI-RS based beam. The gNB may include in the handover command, a CSI-RS based beam and/or the corresponding CSI-RS resource. For each beam or CSI-RS resource included in the handover command for initial access, the gNB assigns only one dedicated RACH resource. The gNB may include more than one beam and/or CSI-RS resource in the handover command. The UE may select the beam/CSI-RS resource and the corresponding RACH resource to use for initial access using one of the beam selection procedures described above.

In another embodiment, the gNB may include in the handover command, an indication to use more than one RACH resources for parallel initial attempts for e.g. using this indication, the UE may transmit one or more additional RACH preambles before the RAR of the first transmitted preamble. Furthermore, the gNB may also include in the handover command, how many parallel attempts, the UE may be allowed to perform. For each beam or CSI resource included in the handover command for initial access, the gNB may assigns more than one dedicated RACH resource. The UE may determine RACH resources for parallel initial attempts, by selecting the up to the number of corresponding beams/CSI-RS resource using one of the beam selection procedures described above.

The UE may also provide assistance information for the UL beam selection. For e.g., the UE may transmit periodic UL reference signal for e.g. an UL reference signal in support of the UL measurement mobility based solution being considered for 5G. The target cell may include in the RRC reconfiguration message passed to the source cell for inclusion in the handover command, the UL beam to be used for the initial access procedure, e.g., for each RACH resource (dedicated RACH resource or common RACH resource), the handover command may include the UL beam that the UE should use.

Figure 16B:
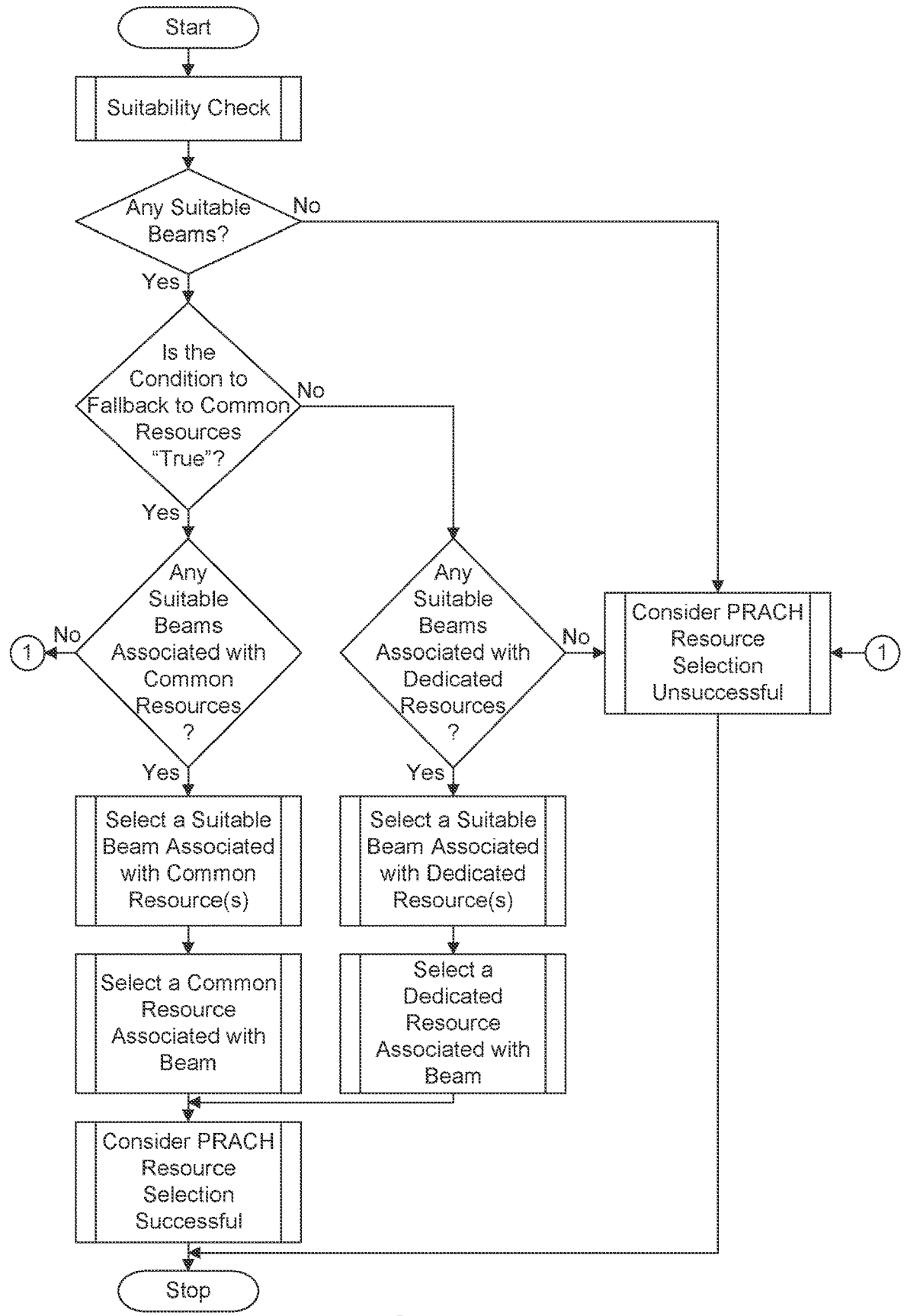
FIG. 16B illustrates a PRACH resource selection procedure according to yet a further embodiment.

According to yet another embodiment, it is envisaged to select the PRACH resource used for access to the target cell from the set of PRACH resources associated with a selected beam. A condition may be based on the number of random access re-transmissions, the expiration of a timer, the notification of power ramping suspension from lower layers or any combination thereof. It may be used to determine if the beam should be attempted to be selected from the set of beams associated with dedicated PRACH resources or if the beam should be attempted to be selected from the set of beams associated with common PRACH resources, i.e., when the UE should "fallback" to the common PRACH resources. A flow chart illustrating the steps of the proposed PRACH resource selection procedure is shown in FIG. 16B. The steps of the proposed PRACH Resource Selection procedure are performed as follows:

1. Determine which of the detected beams of the target cell are suitable for performing random access using the methods described above. For example, a threshold may be used to determine the suitability of the detected beams. The threshold may be set to a value that corresponds to the minimum quality that is required to use a beam for random access. Alternatively, multiple thresholds may be used, where a given threshold is dependent on the type of reference signal associated with the beam. For example, a first threshold; e.g., SSB-threshold, may be used for beams associated with SS blocks and a second threshold; e.g., CSI-RS threshold, may be used for beams associated with CSI-RS configurations. If none of the beams satisfy the threshold(s), any beam that allows the UE to meet the target received power of the RACH preamble with its maximum transmit power may be considered as a suitable beam. Alternatively, when no suitable beam is found, the UE may select the best beam among the detected beams associated with dedicated RACH resources if available, or the best beam among the detected beams associated with the common RACH resources if available, or simply the best beam among all detected beams. Alternatively, if a minimum quality is not required, the threshold(s) may be set to an arbitrarily low value such that all detected beams will pass the suitability check.

If no suitable beams exist, one approach is to consider the PRACH Resource Selection procedure as being unsuccessfully completed. In another approach, the UE may continue to perform measurements and repeat the suitability check multiple times before the PRACH resource selection is considered not successful. The repetition of the procedure may be controlled using a counter, thereby allowing the procedure to be repeated up to N times. In another embodiment, the repetition of the procedure may be controlled using a timer, where the procedure may be repeated until the timer expires. And in yet another embodiment, the repetition of the procedure may be controlled by a counter and a timer, thereby allowing the procedure to be repeated up to N times before the timer expires. In yet another alternative, when no suitable beam is found, the UE may select the best beam among the detected beams associated with dedicated RACH resources if available, or the best beam among the detected beams associated with the common RACH resources if available, or simply the best beam among all detected beams.

According to another embodiment, if the condition is to "fallback" to the common PRACH resources was met, then (i) if there are one or more suitable beams associated with common PRACH resources: (a) select a beam from the set of suitable beams associated with common PRACH resources; (1) if there is only one suitable beam associated with common PRACH resources, select that beam; or (2) if there are multiple suitable beams associated with common PRACH resources: (A) select the beam using any method that results in the selection of one of the suitable beams associated with common PRACH resources. For example, the UE may select the beam associated with common PRACH resources that corresponds to the next PRACH opportunity. Alternatively, the UE may select the "best" beam; e.g., the beam with greatest RSRP, or the UE may randomly select, with equal probability, a beam from the set suitable beams associated with common PRACH resources.

If the condition is to "fallback" to the common PRACH resources was met, then (b) select a common PRACH resource associated with the selected beam: (1) if there is only one common PRACH resource associated with the selected beam, select that common PRACH resource; or (2) if there are multiple common PRACH resources associated with the selected beam: (A) select the common PRACH resource using any method that results in the selection of one of the common PRACH resources associated with the selected beam. For example, the UE may select the common PRACH resource whose PRACH opportunity occurs next or the UE may randomly select, with equal probability, one common PRACH resource from the set of common PRACH resources associated with the selected beam.

The approach may be to (c) consider the PRACH Resource Selection procedure successfully completed. In addition, in (d) we consider the PRACH Resource Selection procedure unsuccessfully completed.

According to another embodiment and/or in furtherance of embodiments discussed above, (ii) if there are one or more suitable beams associated with dedicated PRACH resources: (a) select a beam from the set of suitable beams associated with dedicated resources: (1) if there is only one suitable beam associated with dedicated PRACH resources, select that beam; or (2) if there are multiple suitable beams associated with dedicated PRACH resources:

(A) select the beam using any method that results in the selection of one of the suitable beams associated with dedicated PRACH resources. For example, the UE may select the beam associated with dedicated PRACH resources that correspond to the next PRACH opportunity. The UE may select the "best" beam; e.g., the beam with greatest RSRP, or the UE may randomly select, with equal probability, one beam from the set suitable beams associated with dedicated PRACH resources.

In (b), select a dedicated PRACH resource associated with the selected beam, if (1) if there is only one dedicated PRACH resource associated with the selected beam, select that dedicated PRACH resource; or (2) if there are multiple dedicated PRACH resources associated with the selected beam: (A) select the dedicated PRACH resource using any method that results in the selection of one of the dedicated PRACH resources associated with the selected beam. For example, the UE may select the dedicated PRACH resource whose PRACH opportunity occurs next or the UE may randomly select, with equal probability, one dedicated PRACH resource from the set of common PRACH resources associated with the selected beam.

In (c) consider the PRACH Resource Selection procedure successfully completed. In (d) consider the PRACH Resource Selection procedure unsuccessfully completed.

According to yet even a further embodiment, it is envisaged to select the PRACH resource used for accessing the target cell from the set of PRACH resources associated with a suitable beam. The beam is initially attempted to be selected from the set of suitable beams associated with contention free RA resources (a.k.a. dedicated PRACH resources); and if no such beams exist, the beam is selected from the set of suitable beams associated with common PRACH resources. In one embodiment, a beam is represented by a beam index. For example, beams associated with NR-SS is identified using the SSB index, and beams associated CSI-RS may be identified using the CSI-RS configuration index. The NR-UNIT containing the next available PRACH opportunity (a.k.a. PRACH occasion) may be a subframe, TTI, slot, mini-slot, symbol or any other time unit defined for NR.

Figure 16C:
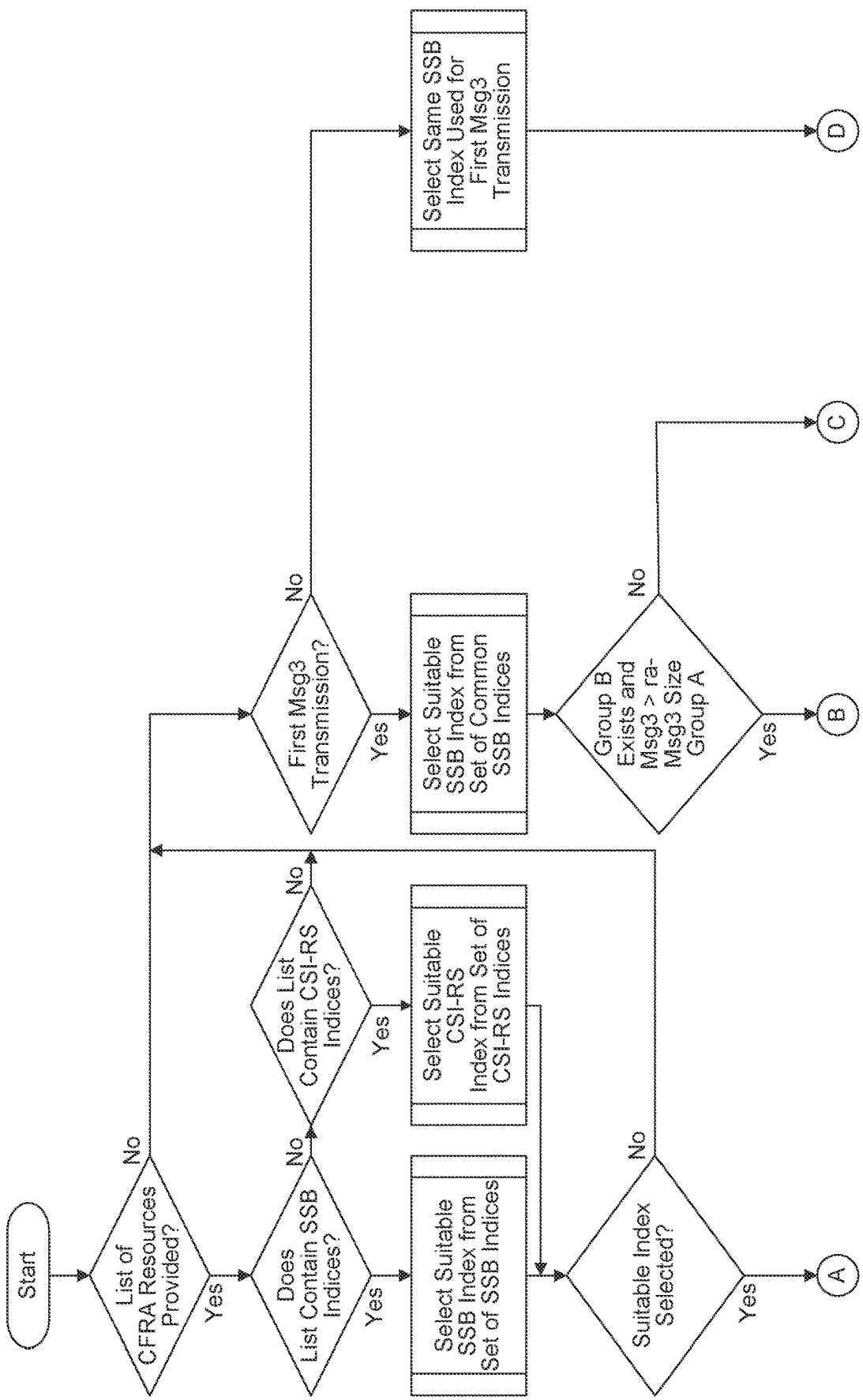
FIG. 16C illustrates a PRACH resource selection procedure according to yet even a further embodiment.
Figure 16C:
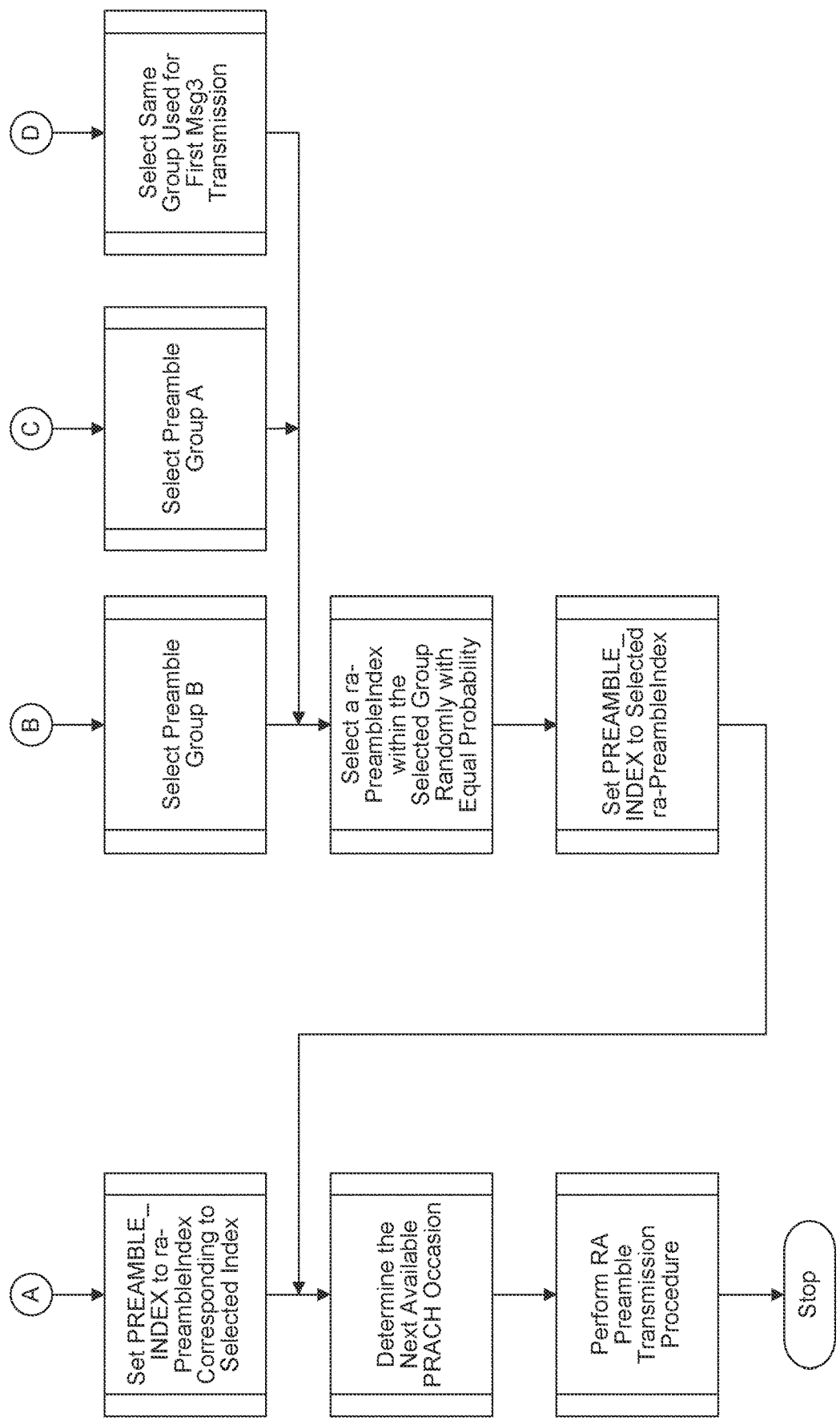

An exemplary illustration of the steps of this proposed PRACH resource selection procedure at the UE is depicted in FIG. 16C. In the first query box of the illustrated decision tree, it is determined whether a list of contention free RA resources has been explicitly provided by RRC. If the answer is Yes, the next query is (i) whether the list of contention free RA resources contains a list of SSB indices. If Yes, (a) a suitable SSB index is selected from the set of explicitly provided SSB indices. The SSB index is considered suitable if it corresponds to a SSB whose quality is above ssb-Threshold. If No, (b) a query is made whether the list of CFRA contains CSI-RS indices. If CSI-RS indices are available (Yes), (1) a suitable CSI-RS index is selected from the set of explicitly provided CSI-RS indices. A CSI-RS index is considered suitable if it corresponds to a CSI-RS whose quality is above csi-rs-Threshold. If the suitable index is selected from either step above—(i)(a) or (i)(b)(1)—the PREAMBLE_INDEX is set to the ra-PreambleIndex corresponding to the selected index.

If the answer to the initial query (i) of whether a list of contention free RA resources has been explicitly provided is No, or alternatively if there is no list containing CSI-RS indices, or alternatively if there is no suitable index selected, then the next query is (ii) whether the first Msg3 has not yet been transmitted (i.e., first Msg3 transmission). If the answer to (ii) is yes, (a) a suitable SSB index is selected from the set of common SSB indices. An SSB index is considered suitable if it corresponds to a SSB whose quality is above ssb-Threshold. Next, if both (1) the Random Access Preambles group B exists on the selected SSB, and (2) the potential Msg3 size (UL data available for transmission plus MAC header and, where required, MAC CEs) is greater than ra-Msg3SizeGroupA on the selected SSB, then (A) Random Access Preambles group B is selected. Otherwise, if (1) and (2) are both false, then (B) Random Access Preambles group A is selected.

In a further embodiment, if the answer to query (ii), namely whether the first Msg3 has not yet been transmitted, is No, then (b) selection is made of the same SSB index as was used for the preamble transmission attempt corresponding to the first transmission of Msg3.

In an alternative embodiment when the answer to (ii) is No, step (b) selects the same SSB index used for the preamble transmission attempt corresponding to the first transmission of Msg3 if suitable. Otherwise, one suitable SSB index from the set of common SSB indices is selected where an SSB index is suitable if it corresponds to a SSB whose quality is above ssb-Threshold.

In yet another alternative embodiment when the answer to (ii) is No, then (c) select an SSB index from the set of explicitly provided SSB indices whose quality is above the quality of the SSB index used for the preamble transmission attempt. This corresponds to the first transmission of Msg3 plus a hysteresis parameter. If no such SSB index exists, select the same SSB index as was used for the preamble transmission attempt corresponding to the first transmission of Msg3 if it is suitable. Otherwise, select one suitable SSB index from the set of common SSB indices, where an SSB index is considered suitable if it is corresponding to a SSB whose quality is above ssb-Threshold.

According to a further embodiment, and subsequent to query step (ii)(b) discussed above, a selection (1) can be made of the same group of Random Access Preambles used for the preamble transmission attempt corresponding to the first transmission of Msg3. Alternatively, if the same SSB index used for the preamble transmission attempt corresponding to the first transmission of Msg3 was selected in the previous step, then in step (A) select the same group of Random Access Preambles as was used for the preamble transmission attempt corresponding to the first transmission of Msg3. Otherwise, in step (B), if the potential Msg3 size (UL data available for transmission plus MAC header and, where required, MAC CEs) is greater than ra-Msg3SizeGroupA on the selected SSB, select the Random Access Preambles group B. Otherwise select the Random Access Preambles group A.

According to a further embodiment, and subsequent to step (ii)(a) or (ii)(b) discussed above, in step (c) a ra-PreambleIndex within the selected group randomly with equal probability is selected. Thereafter in step (d) the PREAMBLE_INDEX to the selected ra-PreambleIndex is set; Thereafter in step (e), the next available PRACH occasion is determined. Further in step (f), the Random Access Preamble transmission procedure is performed.

Load Balancing Between Beams of the Target Cell

Figures 17, 18:
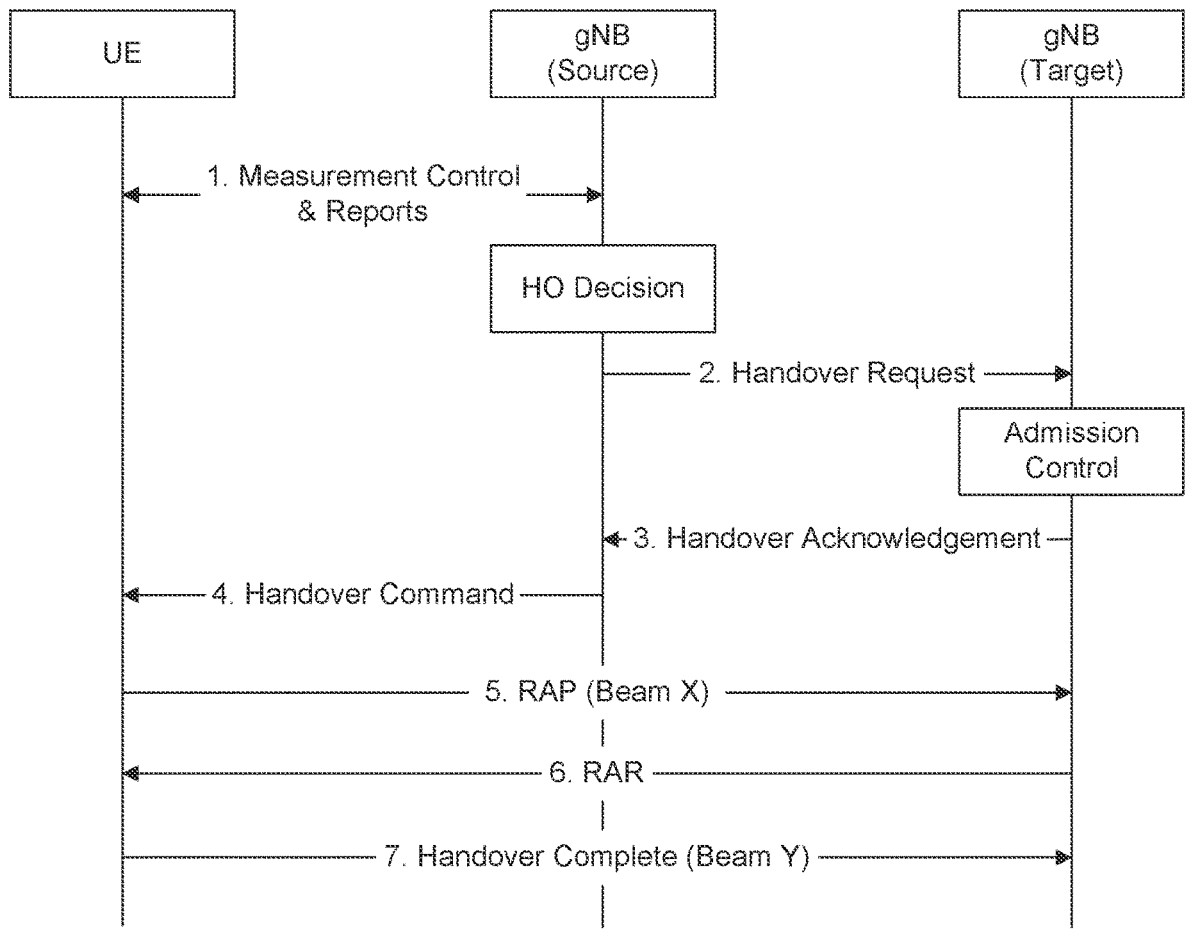
FIG. 17 illustrates a load balancing between beams of a target cell during random access according to another embodiment.
FIG. 18 illustrates a RAR used to direct UE to a different beam according to an embodiment.

According to another aspect, a technique is envisaged to perform load balancing between the beams of the target cell when performing random access. As shown in FIG. 17, a signaling procedure that may be used to perform load balancing between the beams of the target cell when performing random access is described. Each of the steps of FIG. 17 is denoted by an Arabic numeral.

1. The source gNB configures the UE measurement procedures and the UE reports according to the measurement configuration.

2. The source gNB decides to handover the UE, based on measurement reports and RRM information, and issues a Handover Request over the Xn interface.

3. The target gNB performs admission control and provides the RRC configuration as part of the Handover Acknowledgement message.

4. The source gNB provides the RRC configuration to the UE in the Handover Command message. The Handover Command message includes at least cell ID and all information required to access the target cell so that the UE can access the target cell without reading system information. For some cases, the information required for contention based and contention free random access can be included in the Handover Command message. The access information to the target cell may include beam specific information, if any.

5. The UE performs PRACH resource selection and transmits the Random Access Preamble (RAP) using the selected resource.

6. The target gNB determines the load on the beam used by the UE to access the cell is overloaded and directs the UE to use a different beam. The target gNB may decide which beam to direct the UE based on information provided in the Handover Request message. The MAC RAR shown in FIG. 18 may be used to direct the UE to use a different beam during the random access procedure. In one embodiment, the Beam Switch Command field is optionally included in the RAR. Whether or not the field is included in the RAR may by indicated via the Type field in the MAC header for the RAR; i.e. the Type field may include an additional bit to indicate the presence or absence of the Beam Switch command field. In one embodiment, the Beam Switch Command is comprised of a bit to indicate if the beam to switch to is associated with an SS block or a CSI-RS configuration and multiple bits to indicate the ID of the beam; e.g. SS block ID, CSI-RS configuration ID.

7. The UE moves the RRC connection to the target gNB and replies with the Handover Complete message using the beam indicated in the RAR.

Prioritized Random Access

According to yet a further aspect of the application, techniques are proposed to perform prioritized random access. For NR, it has been agreed that random access will be performed for at least the following events: (i) Initial access from RRC_IDLE; (ii) RRC Connection Re-establishment procedure; (iii) Handover; (iv) DL data arrival during RRC_CONNECTED requiring random access procedure, e.g. when UL synchronisation status is "non-synchronised"; (v) UL data arrival during RRC_CONNECTED requiring random access procedure, e.g. when UL synchronisation status is "non-synchronised" or there are no PUCCH resources for SR available; and (vi) Transition from RRC_INACTIVE to RRC_CONNECTED.

To provide differentiation when performing random access, it is envisaged that one or more of following parameters may be configured with values that are dependent on the random access priority:

1. powerRampingStep: power ramping step used for preamble retransmissions;

2. initial back off parameter: default back off time used for preamble retransmissions when the RAR does not contain a Backoff Indicator (BI);

3. Backoff Multiplier: scale factor used to adjust the back off parameter when the RAR contains a BI; and 4. Maximum # of Msg3 HARQ retransmissions.

The values for these parameters may be signaled to the UEs via broadcast or dedicated signaling. For example, the SI broadcast by the gNB may include multiple sets of values, where each set of parameters corresponds to a different random access priority. Alternatively, dedicated RRC signaling may be used to configure UE specific values for each set parameters.

When a random access procedure is triggered for events such as initial access, RRC connection re-establishment, UL data arrival or transition from RRC_INACTIVE to RRC_CONNECTED, a CBRA procedure may be performed. For such scenarios, it is envisaged that the priority of the random access procedure is based on a set of rules that are specified, where the priority of the random access procedure may be determined from the UE's access class, the event type, the QCI of the data triggering the random access procedure or any combination thereof.

When a random access procedure is triggered for events such as handover and DL data arrival a CFRA procedure may be performed. For such scenarios, we propose that in addition to dedicated random access resource(s), the gNB also indicates the priority of the random access procedure. For example, the handover command may include an additional field to signal the random access priority; e.g. as high or low. And in the case of DL data arrival, the gNB may use an NR-PDCCH order that includes an additional bit to signal the random access priority; e.g. as high or low. Alternatively, the priority of such events could be specified. For example, when performing CFRA, there will not be contention, so it is unlikely that a retransmission will be required. Therefore, the random access priority when performing CFRA could be considered low.

It also possible to perform a CBRA procedure for events such as handover and DL data arrival. For such scenarios, we propose that the priority of the random access procedure is based on a set of rules that are specified, where the priority of the random access procedure may be determined from the UE's access class, the event type, the QCI of the data triggering the random access procedure or any combination thereof.

According to the present application, it is understood that any or all of the systems, methods and processes described herein may be embodied in the form of computer executable instructions, e.g., program code, stored on a computer-readable storage medium which instructions, when executed by a machine, such as a computer, server, M2M terminal device, M2M gateway device, transit device or the like, perform and/or implement the systems, methods and processes described herein. Specifically, any of the steps, operations or functions described above may be implemented in the form of such computer executable instructions. Computer readable storage media includes volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CD ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

According to yet another aspect of the application, a non-transitory computer-readable or executable storage medium for storing computer-readable or executable instructions is disclosed. The medium may include one or more computer-executable instructions such as disclosed above in the plural call flows according to FIGS. 11-14, 16A-C and 17. The computer executable instructions may be stored in a memory and executed by a processor disclosed above in FIGS. 1C and 1F, and employed in devices including a node such as for example, a base station and end-user equipment. In particular, the UE as shown for example in FIGS. 1B and 1E is configured to perform the instructions of detecting beams associated with a target cell. The processor is also configured to execute the instruction of determining, via a check function, which of the detected beams meet a quality threshold for performing random access. The processor is also configured to execute the instructions of receiving, at a resource selection function, the threshold-meeting detected beams. Further, the processor is configured to execute the instructions of selecting, PRACH resources associated from the threshold-meeting detected beams. In another embodiment, the processor may also be configured to perform the instructions of load balancing between beams of a target cell during random access.

While the systems and methods have been described in terms of what are presently considered to be specific aspects, the application need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. An apparatus in a network comprising:
a non-transitory memory including instructions stored thereon; and
a processor, operably coupled to the non-transitory memory, configured to execute the instructions of:
receiving a message via a radio resource control (RRC) signaling,
wherein the message comprises:
information of physical random access channel (PRACH) resources associated with one or more reference signals, and
a threshold for determining whether the PRACH resources can be used for performing random access,
wherein the threshold is a reference signal received power (RSRP)-based threshold,
wherein the PRACH resources comprise dedicated PRACH resources, common PRACH resources, or a combination thereof; and
upon determining that at least one reference signal of the one or more reference signals meets the threshold for performing the random access:
selecting one of the PRACH resources associated with the at least one reference signal,
wherein the selecting includes prioritizing any reference signals of the at least one reference signal with dedicated PRACH resources; and
transmitting a PRACH preamble using the one selected PRACH resource,
wherein:
the one or more reference signals comprises one or more Synchronization Signal Blocks (SSBs) and the threshold comprises a SSB threshold, or
the one or more reference signals comprises one or more Channel State Information Reference Signals (CSI-RSs) and the threshold comprises a CSI-RS threshold.

2. The apparatus of claim 1, wherein, for any dedicated PRACH resources, the information of PRACH resources comprises:
a SS Block ID when the one or more reference signals comprises one or more SSBs, or
a CSI-RS Configuration ID when the one or more reference signals comprises one or more CSI-RSs.

3. The apparatus of claim 1, wherein the processor is further configured to execute the instructions of:
upon determining none of the one or more reference signals meets the threshold for performing random access:
selecting one of the PRACH resources based upon a predetermined criteria, and
transmitting the PRACH preamble using the one PRACH resource that is selected based upon the predetermined criteria.

4. The apparatus of claim 1, wherein the PRACH resources correspond to a next PRACH occasion.

5. An apparatus in a network comprising:
a non-transitory memory including instructions stored thereon; and
a processor, operably coupled to the non-transitory memory, configured to execute the instructions of:
transmitting, to a user equipment (UE), a message via radio resource control (RRC) signaling, wherein the message comprises:
information of physical random access channel (PRACH) resources associated with one or more reference signals, and
a threshold for determining whether the PRACH resources can be used for performing random access,
wherein the threshold is a reference signal received power (RSRP)-based threshold,
wherein the PRACH resources comprise dedicated PRACH resources, common PRACH resources, or a combination thereof; and
based on the UE:
a) determining that at least one reference signal of the one or more reference signals meets the threshold for performing the random access, and
b) selecting one of the PRACH resources associated with the at least one reference signal, where the selecting includes prioritizing any reference signals of the at least one reference signal with dedicated PRACH resources,
receiving a PRACH preamble from the UE via the one PRACH resource selected by the UE,
wherein:
the one or more reference signals comprises one or more Synchronization Signal Blocks (SSBs) and the threshold comprises a SSB threshold, or
the one or more reference signals comprises one or more Channel State Information Reference Signals (CSI-RSs) and the threshold comprises a CSI-RS threshold.

6. The apparatus of claim 5, wherein, for any dedicated PRACH resources, the information of PRACH resources comprises:
a SS Block ID when the one or more reference signals comprises one or more SSBs, or
a CSI-RS Configuration ID when the one or more reference signals comprises one or more CSI-RSs.

7. A method performed by an apparatus and comprising:
transmitting, to a user equipment (UE) in a network, a message via radio resource control (RRC) signaling,
wherein the message comprises:
information of physical random access channel (PRACH) resources associated with one or more reference signals, and
a threshold for determining whether the PRACH resources can be used for performing random access,
wherein the threshold is a reference signal received power (RSRP)-based threshold,
wherein the PRACH resources comprise dedicated PRACH resources, common PRACH resources, or a combination thereof; and
based on the UE:
a) determining that at least one reference signal of the one or more reference signals meets the threshold for performing the random access, and
b) selecting one of the PRACH resources associated with the at least one reference signal, where the selecting includes prioritizing any reference signals of the at least one reference signal with dedicated PRACH resources,
receiving a PRACH preamble from the UE via the one PRACH resource selected by the UE,
wherein:
the one or more reference signals comprises one or more Synchronization Signal Blocks (SSBs) and the threshold comprises a SSB threshold, or
the one or more reference signals comprises one or more Channel State Information Reference Signals (CSI-RSs) and the threshold comprises a CSI-RS threshold.

8. The method of claim 7, wherein the apparatus is a base station.

9. The method of claim 7, wherein, for any dedicated PRACH resources, the information of PRACH resources comprises:
a SS Block ID when the one or more reference signals comprises one or more SSBs, or
a CSI-RS Configuration ID when the one or more reference signals comprises one or more CSI-RSs.

10. The apparatus of claim 1, wherein the information of PRACH resources comprises:
a RACH-ConfigCommon IE for storing parameters of any common PRACH resources, and
a RACH-ConfigDedicated IE for storing parameters of any dedicated PRACH resources,
wherein, when the one or more reference signals comprises one or more CSI-RSs, the RACH-ConfigDedicated IE comprises a CSI-RS Configuration ID and the CSI-RS threshold.

11. The apparatus of claim 5, wherein the information of PRACH resources comprises:
a RACH-ConfigCommon IE for storing parameters of any common PRACH resources, and
a RACH-ConfigDedicated IE for storing parameters of any dedicated PRACH resources,
wherein, when the one or more reference signals comprises one or more CSI-RSs, the RACH-ConfigDedicated IE comprises a CSI-RS Configuration ID and the CSI-RS threshold.

12. The method of claim 7, wherein the information of PRACH resources comprises:
a RACH-ConfigCommon IE for storing parameters of any common PRACH resources, and
a RACH-ConfigDedicated IE for storing parameters of any dedicated PRACH resources,
wherein, when the one or more reference signals comprises one or more CSI-RSs, the RACH-ConfigDedicated IE comprises a CSI-RS Configuration ID and the CSI-RS threshold.

* * * * *